United States Patent
Ryan et al.

(10) Patent No.: US 9,419,857 B1
(45) Date of Patent: Aug. 16, 2016

(54) CLOUD-BASED MULTI-LAYER SECURITY ARCHITECTURE WITH HUB AND SPOKE DEVELOPMENT ENVIRONMENT

(71) Applicant: Accenture Global Services Limited, Dublin (IE)

(72) Inventors: Jeffrey Stanford Ryan, Phoenix, AZ (US); John Stevenson, Fort Worth, TX (US); Bahij Nahhas, Round Rock, TX (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/959,625

(22) Filed: Dec. 4, 2015

Related U.S. Application Data

(60) Provisional application No. 62/196,784, filed on Jul. 24, 2015.

(51) Int. Cl.
H04L 12/24 (2006.01)
H04L 29/08 (2006.01)
H04L 29/06 (2006.01)

(52) U.S. Cl.
CPC ............ *H04L 41/0813* (2013.01); *H04L 63/08* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,819,488 B1 * | 8/2014 | Arguelles | ............ | G06F 11/2635 714/25 |
| 2010/0125618 A1 * | 5/2010 | Dutta | ......................... | G06F 8/10 707/822 |
| 2011/0107299 A1 * | 5/2011 | Dehaan | ............... | G06F 9/45533 717/121 |
| 2011/0112790 A1 * | 5/2011 | Lavie | ..................... | G06F 11/263 702/123 |
| 2011/0219111 A1 * | 9/2011 | Shevenell | ............ | G06F 15/173 709/224 |
| 2014/0379897 A1 * | 12/2014 | Stroomer | ................ | H04L 43/50 709/224 |
| 2015/0058467 A1 * | 2/2015 | Douglas | ............ | G06Q 10/0631 709/223 |
| 2015/0100684 A1 * | 4/2015 | Maes | .................. | G06F 11/3672 709/224 |
| 2015/0134589 A1 * | 5/2015 | Marrelli | ............ | G06F 17/30563 707/602 |
| 2016/0019041 A1 * | 1/2016 | Smith | ..................... | H04L 67/34 717/177 |

* cited by examiner

*Primary Examiner* — Natisha Cox
(74) *Attorney, Agent, or Firm* — Harrity & Harrity, LLP

(57) ABSTRACT

A system may receive a development update. The system may authenticate the development update. The system may progress the development update through multiple stages of development. The multiple stages of development may include a first virtual network including a group of development servers. The multiple stages of development may include a second virtual network including a group of quality assurance and testing servers. The multiple stages of development may include a third virtual network including a group of end-to-end testing servers. The multiple stages of development may include a fourth virtual network including a group of staging servers. The multiple stages of development may include a fifth virtual network including a group of production servers. The system may connect to the first virtual network, the second virtual network, the third virtual network, the fourth virtual network, and the fifth virtual network in a hub-and-spoke configuration.

20 Claims, 12 Drawing Sheets

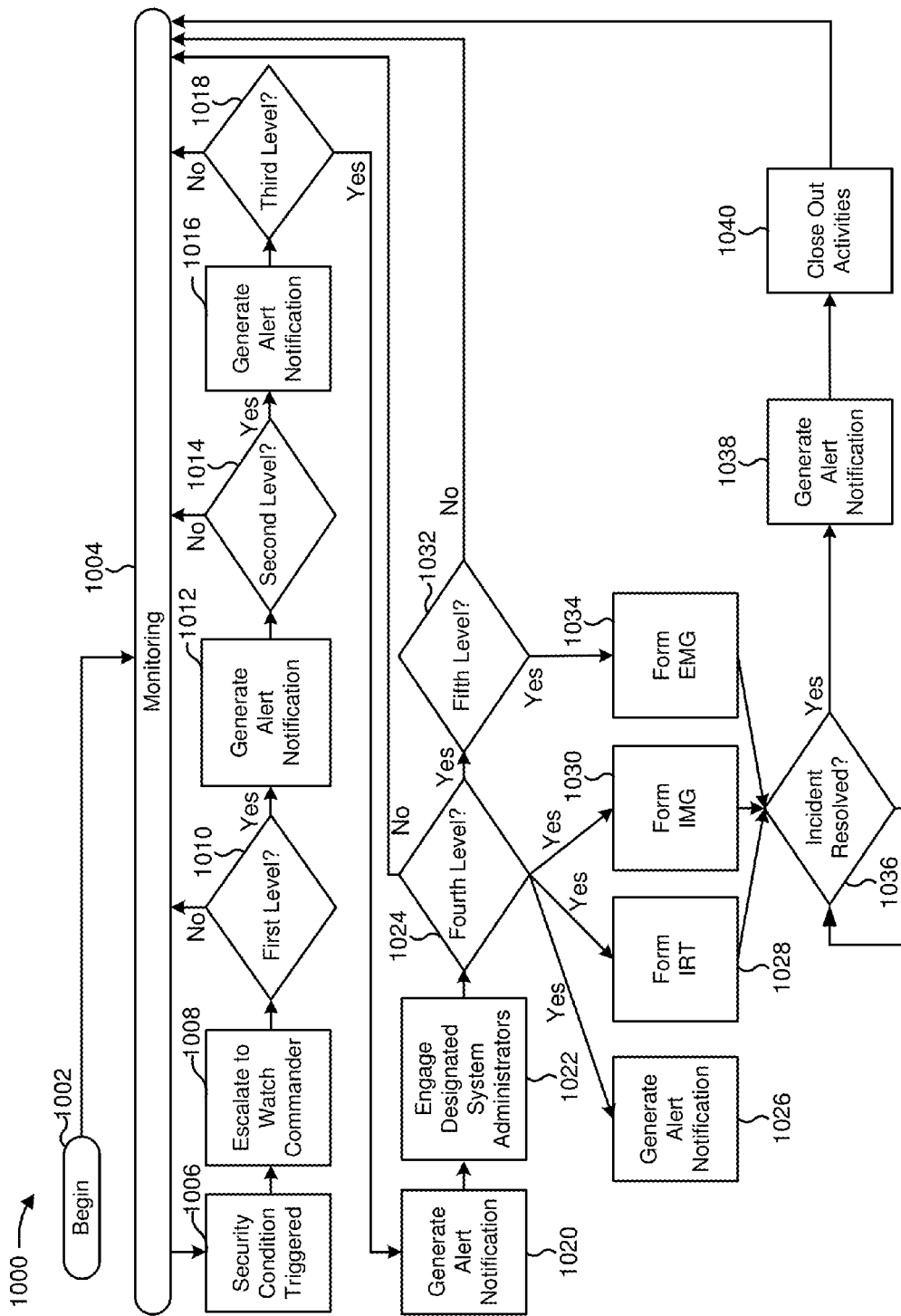

CLOUD-BASED MULTI-LAYER SECURITY ARCHITECTURE WITH HUB AND SPOKE DEVELOPMENT ENVIRONMENT

RELATED APPLICATION(S)

This application claims priority under 35 U.S.C. §119 to U.S. Provisional Patent Application No. 62/196,784, filed on Jul. 24, 2015, the content of which is incorporated by reference herein in its entirety.

BACKGROUND

A cloud-based computing platform may be utilized to operate a set of servers associated with a web platform. The cloud-based computing platform may include a scalable set of computing resources that may be selectively assignable to a particular portion of the web platform or to perform a particular function of the web platform. For example, a user of the cloud-based computing platform may request and may be provided a first quantity of computing resources to manage a first quantity of demand and a second quantity of computing resources to manage a second quantity of demand.

SUMMARY

According to some possible implementations, a system may include one or more build servers. The one or more build servers may receive a development update. The one or more build servers may authenticate the development update. The one or more build servers may progress the development update through multiple stages of development. The multiple stages of development may include a first virtual network including a group of development servers for developing the development update. The multiple stages of development may include a second virtual network including a group of quality assurance and testing servers for performing quality assurance and testing on the development update after developing the development update. The multiple stages of development may include a third virtual network including a group of end-to-end testing servers for performing end-to-end testing on the development update after performing quality assurance and testing. The multiple stages of development may include a fourth virtual network including a group of staging servers for performing pre-production staging of the development update after performing end-to-end testing on the development update. The multiple stages of development may include a fifth virtual network including a group of production servers for implementing the development update after performing pre-production staging of the development update. The build server may connect to the first virtual network, the second virtual network, the third virtual network, the fourth virtual network, and the fifth virtual network in a hub-and-spoke configuration.

According to some possible implementations, a method may include receiving, by a device, a development update for testing via a plurality of virtual networks. The development update may be associated with a web platform for product delivery. The method may include authenticating, by the device, the development update. The method may include providing, by the device, the development update to a first virtual network, of the plurality of virtual networks, to perform development testing on the development update based on authenticating the development update. The method may include providing, by the device, the development update to a second virtual network, of the plurality of virtual networks, to perform quality assurance and testing on the development update after receiving a result from providing the development update to the first virtual network. The method may include providing, by the device, the development update to a third virtual network, of the plurality of virtual networks, to perform end to end testing on the development update after receiving a result from providing the development update to the second virtual network. The method may include providing, by the device, the development update to a fourth virtual network, of the plurality of virtual networks, to perform pre-production staging of the development update after receiving a result from providing the development update to the third virtual network. The method may include providing, by the device, the development update to a fifth virtual network, of the plurality of virtual networks, to implement the development update after receiving a result from providing the development update to the fourth virtual network. The device may connect to the first virtual network, the second virtual network, the third virtual network, the fourth virtual network, and the fifth virtual network, in a hub-and-spoke configuration.

According to some possible implementations, a virtual network may include one or more computing resources. The one or more computing resources may receive a development update from a client device for testing via a plurality of virtual networks. The one or more computing resources may authenticate the development update. The one or more computing resources may provide the development update to a development virtual network, of the plurality of virtual networks, to perform a set of development tests. The one or more computing resources may receive information indicating that the development update satisfies the set of development tests. The one or more computing resources may provide the development update to quality assurance and testing virtual network, of the plurality of virtual networks, to perform a set of quality assurance and testing tests. The one or more computing resources may receive information indicating that the development update satisfies the set of quality assurance and testing tests. The one or more computing resources may provide the development update to an end-to-end testing virtual network, of the plurality of virtual networks, to perform a set of end-to-end tests. The one or more computing resources may receive information indicating that the development update satisfies the set of end-to-end tests. The one or more computing resources may provide the development update to a staging virtual network, of the plurality of virtual networks, to perform a set of staging tests. The one or more computing resources may receive information indicating that the development update satisfies the set of staging tests. The one or more computing resources may provide information associated with the development update based on receiving the information indicating that the development update satisfies the set of staging tests.

BRIEF DESCRIPTION OF THE DRAWINGS

FIG. 10 is a diagram of an example implementation relating to the example process shown in FIG. 8.

DETAILED DESCRIPTION

Figure 1:
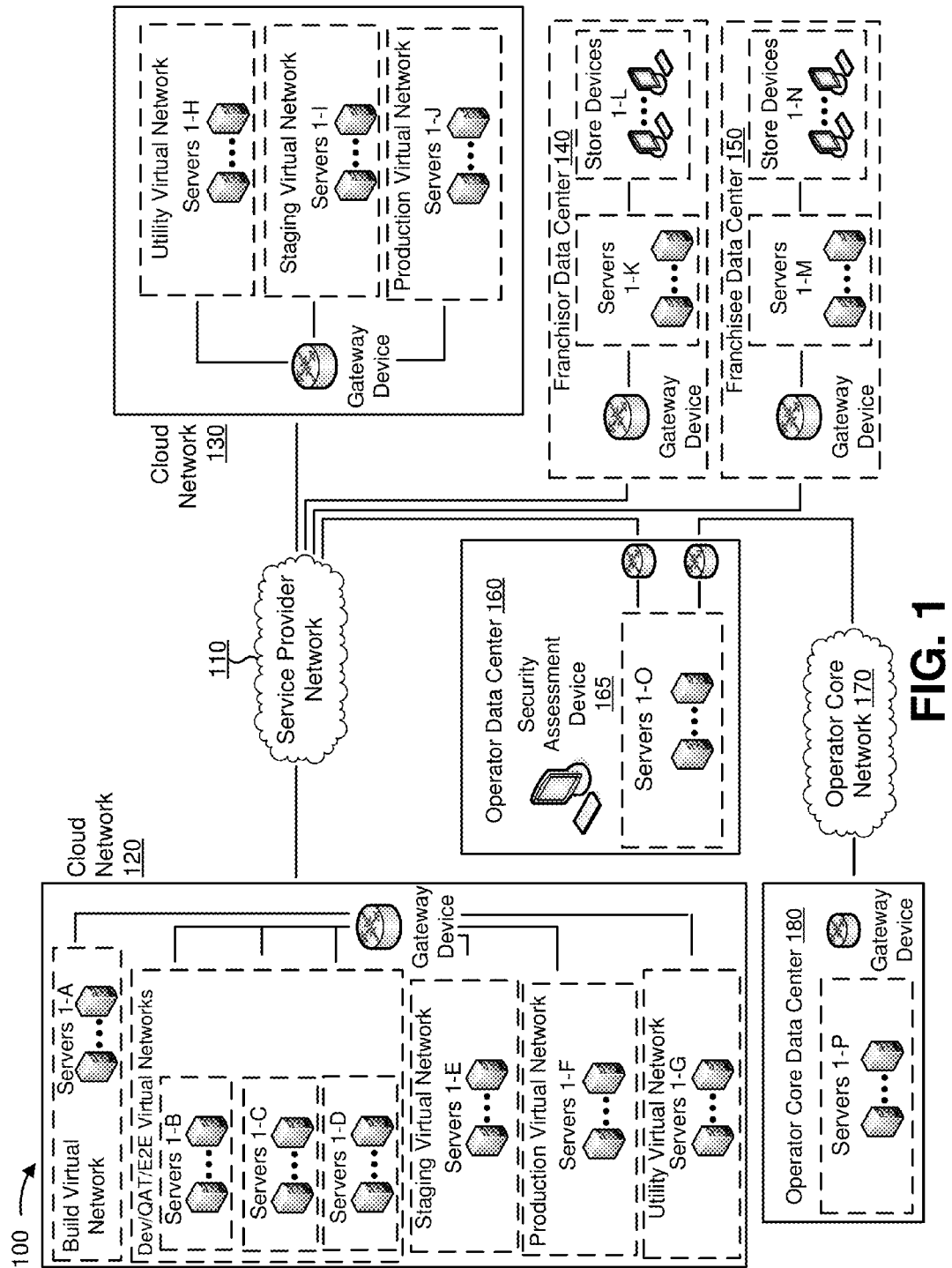
FIG. 1 is a diagram of an example environment in which systems and/or methods, described herein, may be implemented.

The following detailed description of example implementations refers to the accompanying drawings. The same reference numbers in different drawings may identify the same or similar elements.

A cloud-based computing platform may facilitate scalable allocation of computing resources, such as processing resources, storage resources, routing resources, or the like. A user of the cloud-based computing platform may request a first quantity of resources at a first time and a second quantity of resources at a second time. Additionally, or alternatively, allocation of resources may occur automatically as a functionality of the cloud-based computing platform and without the user being required to manually configure the allocation of resources. The cloud-based computing platform may support a web platform (e.g., a website supported by a cloud-based platform), such as a web platform associated with facilitating ordering and delivery of a food product or another type of web platform.

However, development of an alteration for the web platform may include multiple types of testing, some of which may include testing using portions of the web platform that include confidential information (e.g., credit card information, user identification information, or the like). Implementations, described herein, may utilize a hub and spoke development environment to provide security for developing an alteration for a cloud-based computing platform associated with operating a web platform. In this way, the cloud-based computing platform may facilitate improved information security, version control, or the like relative to another computing platform that does not utilize a hub and spoke configuration, cloud scalability, or the like.

Service provider network 110 may include one or more wired and/or wireless networks. For example, service provider network 110 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an enterprise network, or the like, and/or a combination of these or other types of networks. In some implementations, service provider network 110 may include a backbone network, such as a backbone network of a telecom service provider, an internet service provider, or the like. For example, service provider network 110 may include an Internet protocol/multiprotocol label switching (IP/MPLS) backbone network associated with providing interconnectivity to multiple sub-networks, data centers, or the like.

Cloud network 120 and/or another cloud network described herein (e.g., cloud network 130 or the like) may include a cloud-based computing platform providing one or more computing resources, such as a Microsoft Azure cloud, an Amazon web services (Amazon AWS) cloud, or the like. For example, cloud network 120 may include one or more servers, routers, gateways, switches, hubs, data storage units, or the like assignable for one or more functionalities of a web platform. In some implementations, cloud network 120 may facilitate scaling of computing resources. For example, cloud network 120 may assign a first quantity of computing resources for processing user requests for food delivery at a first time and a second quantity of computing resources for processing user requests for food delivery at a second time based, respectively, on computing resource demand at the first time and the second time. In some implementations, cloud network 120 may include a set of virtual networks. A virtual network may include a set of computing resources conceptually grouped with a set of virtualized network links. For example, the virtual network may include a set of virtual machines, a set of virtual firewalls, or the like that are connected via one or more virtual network links.

In some implementations, cloud network 120 may include a set of servers, gateways, firewall devices, or the like. For example, cloud network 120 may include a set of physical servers providing assignable computing resources, a set of virtualized servers representing the assignable computing resources, or the like. A server, as described herein, may refer to a physical server that is associated with cloud network 120, a virtualized server (e.g., a conceptual representation of computing resources that are at least partially implemented in hardware and are allocated by cloud network 120 for a particular functionality), or the like. In some implementations, a server may represent a group of servers. For example, although a production virtual network (described herein) may be described as including a customer portal server, the production virtual network may include a group of customer portal servers (e.g., 5 servers, 10 servers, 20 servers, or the like) that may be scaled based on demand for access to the customer portal. Similarly, a gateway device may refer to a physical gateway device, a virtualized gateway device (e.g., a set of computing resources that are at least partially implemented in hardware and are assigned to perform one or more functionalities of a gateway device), or the like. In other words, a virtual network may be assigned a set of computing resources, which may be conceptually described as servers, gateways, firewalls, or the like.

Cloud network 120 may include, in the set of virtual networks, a build virtual network, in some implementations. For example, cloud network 120 may designate a portion of computing resources (e.g., "Servers 1-A") as allocated for functionalities of the build virtual network. Similarly, cloud network 120 may include a development ("Dev") virtual network, a quality assurance testing (QAT) virtual network, and an end to end testing (E2E) virtual network with portions of computing resources allocated thereto (e.g., servers "1-B," "1-C," and "1-D," respectively). Similarly, cloud network 120 may include a staging virtual network (e.g., with computing resources, "Servers 1-E"), a production virtual network (e.g., with computing resources, "Servers 1-F"), a utility virtual network (e.g., with computing resources, "Servers 1-G"), and a gateway device (e.g., a quantity of computing resources allocated for performing network gateway functions). In some implementations, cloud network 120 may include a resource allocation management device associated with dynamically scaling computing resources of one or more portions of cloud network 120. For example, cloud network 120 may utilize a scaling controller (e.g., a resource allocation management device that selectively allocates and/or reallocates computing resources) to assign a quantity of computing resources to a portion of cloud network 120.

Cloud network 130 may include a set of virtual networks, in some implementations. For example, cloud network 130 may include a utility virtual network (e.g., with computing resources, "Servers 1-H"), a staging virtual network (e.g., with computing resources, "Servers 1-I"), a production virtual network (e.g., with computing resources, "Servers 1-J"), and a gateway device. Collectively, cloud network 120 and cloud network 130 (and/or one or more other, similar cloud networks) may support a web platform, such as an end to end ecommerce platform for food delivery, in some implementations. For example, cloud network 120 and cloud network 130 may facilitate order processing, store administration, inventory management, or the like.

Some virtual networks of cloud network 120 may correspond to other virtual networks of cloud network 130. For example, a first production virtual network of cloud network 120 may correspond to a second production virtual network of cloud network 130. In this case, network traffic may be routed to one of the first production virtual network or the second production virtual network based on a set of load balancing criteria, a set of backup criteria, a set of geographic criteria, or the like. For example, cloud network 120 may be established for managing network traffic associated with the East Coast of the United States, cloud network 130 may be established for managing network traffic associated with the West Coast of the United States, and one or more other cloud networks may be established for managing other network traffic, as backup cloud networks, or the like. In this way, cloud network 120 and cloud network 130 may increase web platform robustness relative to a single cloud network based on facilitating redundancy of virtual networks.

Additionally, or alternatively, some virtual networks of cloud network 120 may not correspond to other virtual networks of cloud network 130. For example, testing operations may be designated as non-critical operations (e.g., if one or more computing resources associated with performing program code testing are unavailable, operation of the web platform may remain unaffected for customers). In this case, testing operations may be performed in cloud network 120 utilizing the development, QAT, and E2E virtual networks and corresponding virtual networks may not be established in cloud network 130. In this way, resource allocation is reduced (e.g., by not duplicating testing operations) and program code continuity may be improved (e.g., by reducing a likelihood of discontinuity resulting from testing operations being performed in multiple different environments without centralized control) relative to a configuration that duplicates testing operations across each cloud network. The set of virtual networks are described in additional detail with regard to FIGS. 2 through 7.

Franchisor data center 140 may include one or more data centers operated by a franchisor. For example, franchisor data center 140 may include a gateway device, a set of computing resources (e.g., "Servers 1-K"), and a set of store devices (e.g., "Store Devices 1-L"). The set of store devices may refer to one or more devices (e.g., point of sale (POS) devices) associated with receiving an order for food delivery from a store location, generating pricing information for the order, assigning the order for fulfillment by the store location (e.g., adding items of the order to a preparation queue), or the like.

In some implementations, the set of store devices may include multiple types of store devices associated with multiple information formats. For example, a first store location may utilize a first type of store device and a second store location may utilize a second type of store device. In this case, one or more portions of cloud network 120, cloud network 130, or the like may be designated for altering an order, received via a web platform, to a format associated with a particular store device associated with a store location assigned for fulfilling the order.

Franchisee data center 150 may include one or more data centers operated by a franchisee of the franchisor. For example, a commercial entity separate from the franchisor may operate a set of store locations as a franchisee of the franchisor, and may operate a data center with a set of computing resources (e.g., a gateway device, a set of servers "1-M," a set of store devices "1-N," etc.), separated from franchisor data center 140, for managing store operations, order allocation, or the like, but may utilize the same web platform as the franchisor (and/or one or more franchisees thereof that lack a separate data center). In this case, one or more computing resources of franchisee data center 150 may provide information to the web platform (e.g., via cloud network 120, cloud network 130, etc.), receive information from the web platform, or the like.

Operator data center 160 may include one or more data centers operated by an operator of the web platform. For example, the franchisor may contract with the operator to provide services for the web platform relating to operation, such as security services, maintenance services, program code generation, testing, and updating services, or the like. In this case, the operator may utilize an operator data center with a set of gateway devices, a set of computing resources (e.g., "Servers 1-O"), or the like to perform one or more functionalities associated with operating the web platform of cloud network 120, cloud network 130, or the like.

Security assessment device 165 may refer to one or more devices associated with performing a security assessment for a cloud network, one or more devices and/or computing resources of the cloud network, a web platform associated with the cloud network, or the like. For example, security assessment device 165 may include a desktop computer, a laptop computer, a tablet computer, a mobile phone (e.g., a smart phone, a radiotelephone, etc.), a server, or a similar type of device. In some implementations, security assessment device 165 may be associated with a set of threat assessment levels, as described in detail with regards to FIG. 9. In some implementations, security assessment device 165 may communicate with and/or control one or more devices and/or computing resources described herein to obtain information regarding a security situation, monitor a security situation, remediate a security situation, perform a response action to a security situation, classify a security situation, assign one or more tasks to one or more users based on a security situation, or the like. Although security assessment device 165 is depicted as being included in operator data center 160, security assessment device 165 may be included with another group of devices, such as in cloud network 120, cloud network 130, operator core data center 180, or the like.

Operator core network 170 include one or more wired and/or wireless networks. For example, operator core network 170 may include a cellular network, a PLMN, a LAN, a WAN, a MAN, a telephone network, a private network, an ad hoc network, an intranet, the Internet, a fiber optic-based network, a cloud computing network, an enterprise network, or the like, and/or a combination of these or other types of networks. In some implementations, operator core network 170 may facilitate connectivity between one or more computing resources of operator data center 160 and one or more computing resources of operator core data center 180.

Operator core data center 180 may include one or more data centers operated by the operator of the web platform. For example, the operator may utilize a set of operator data centers 160 that communicate directly with cloud network 120, cloud network 130, or the like and a set of operator core data centers 180 that provide backend services for operator data centers 160. In some implementations, operator core data center 180 may include a set of computing resources (e.g., a gateway device, "Servers 1-P," or the like).

In this way, environment 100 may utilize cloud networks, allocated into groups of virtual networks, to facilitate multi-layer security within a virtual network (e.g., by utilizing cloud scalability functionalities to operate layers of security that could require an infeasible quantity of resources if the resources were allocated in a fixed manner), security designed hub-and-spoke configured virtual networks for program code testing and implementation operations (e.g., by utilizing cloud scalability functionalities to separate testing and implementation operations into multiple separated virtual networks that are allocated resources in a scaling manner), and security operations (e.g., by utilizing virtualization to reallocate and reconfigure portions of environment 100 on an as-needed basis to respond to security situations).

The number and arrangement of devices, computing resources, and networks shown in FIG. 1 are provided as an example. In practice, there may be additional devices, computing resources, and/or networks, fewer devices, computing resources, and/or networks, different devices, computing resources, and/or networks, or differently arranged devices, computing resources, and/or networks than those shown in FIG. 1. Furthermore, two or more devices and/or computing resources shown in FIG. 1 may be implemented within a single device or computer resource allocation, or a single device and/or computing resource allocation shown in FIG. 2 may be implemented as multiple, distributed devices and/or computing resources. Additionally, or alternatively, a set of devices (e.g., one or more devices) and/or computing resources of environment 100 may perform one or more functions described as being performed by another set of devices and/or computing resources of environment 100.

Figure 2:
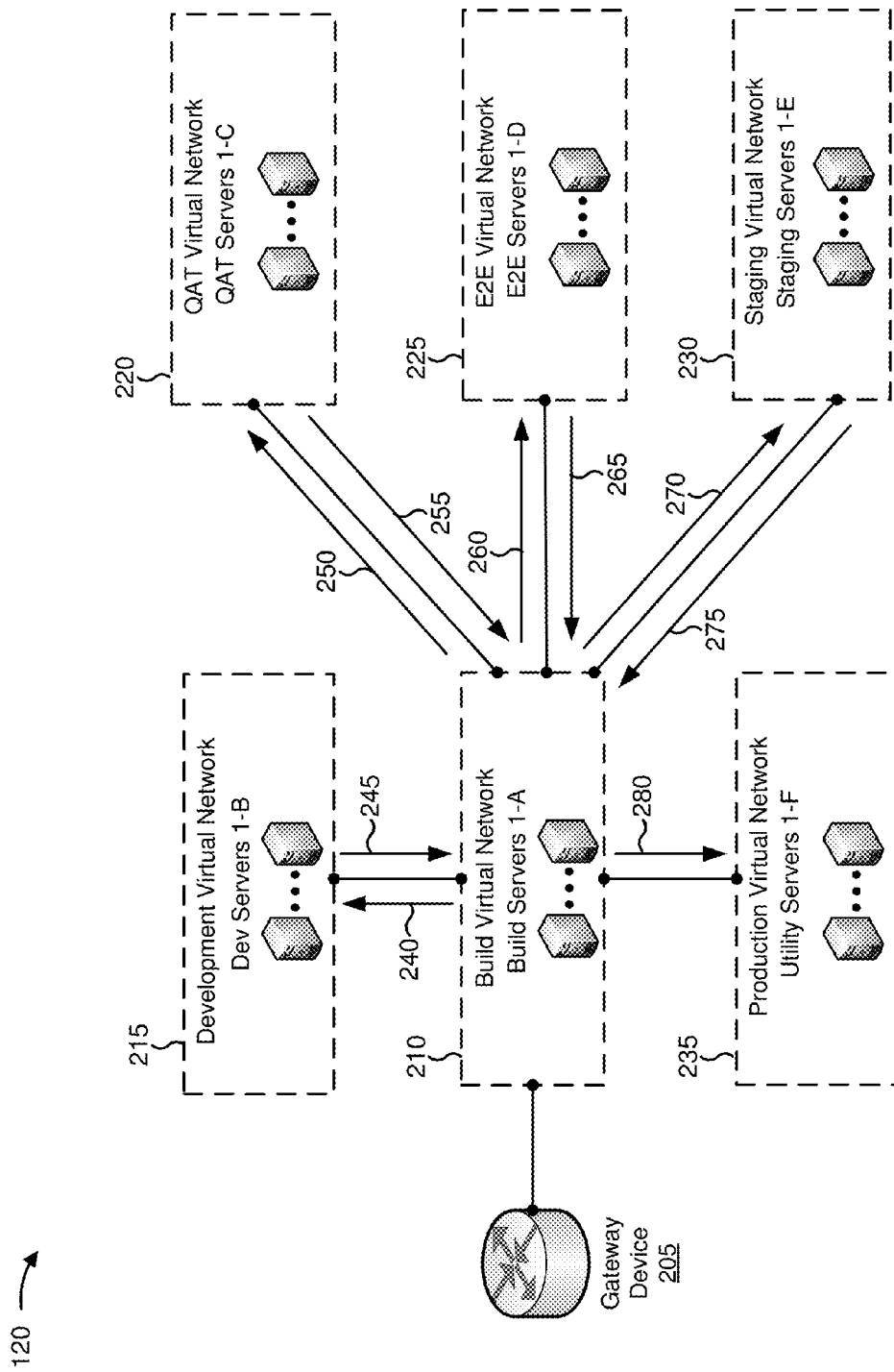
FIG. 2 is a diagram of a hub-and-spoke development environment relating to a cloud network shown in FIG. 1.

FIG. 2 is a diagram of an example of virtual networks of cloud network 120 of FIG. 1. FIG. 2 shows an example of a hub-and-spoke development environment.

As shown in FIG. 2, cloud network 120 may include a gateway device 205 that facilitates a direct connection to cloud network 120. For example, a server of operator data center 160 may utilize a direct connection associated with gateway device 205 to access, control, and/or utilize computing resources of cloud network 120 (e.g., a Microsoft Azure ExpressRoute connection, an Amazon AWS Direct Connect connection, etc.). In some implementations, gateway device 205 may include an MPLS gateway device, a virtualized gateway device, or the like.

As shown, cloud network 120 may include a build virtual network 210, which may connect to development virtual network 215 (e.g., a group of development servers), QAT virtual network 220 (e.g., a group of QAT servers), E2E virtual network 225 (e.g., a group of E2E testing servers), staging virtual network 230 (e.g., a group of staging servers), and/or production virtual network 235 (e.g., a group of production servers). In some implementations, development virtual network 215, QAT virtual network 220, and/or E2E virtual network 225 may be configured as different virtual networks. Additionally, or alternatively, development virtual network 215, QAT virtual network 220, and/or E2E virtual network 225 may be configured as portions of the same virtual network, such as sub-virtual networks, computing resource groups, or the like. In some implementations, the hub-and-spoke development environment may include a set of gateway devices, such as a gateway device separating each virtual network, such as separating development virtual network 215 from build virtual network 210, separating QAT virtual network 220 from build virtual network 210, or the like.

As further shown in FIG. 2, build virtual network 210 may facilitate development of a web platform using a hub-and-spoke development environment. For example, when a developer generates program code for utilization in the web platform, the program code is provided to a build server of build virtual network 210. In some implementations, build virtual network 120 may progress a development update through multiple different stages of development of the hub-and-spoke development environment. For example, build virtual network 210 may provide a development update (e.g., a program code for altering the web platform) to development virtual network 215 as a first stage of development, may receive information indicating that a set of testing criteria of development virtual network 215 are satisfied by the development update, and may provide the development update to QAT virtual network 220 as a second stage of development. Similarly, build virtual network 210 may provide the development update as a first stage of development to staging virtual network 230, and may subsequently provide the development update as a second stage of development to production virtual network 235.

In some implementations, cloud network 120 may include multiple versions of a particular virtual network. For example, cloud network 120 may include a first development virtual network 215, a second development virtual network 215, or the like. In this case, build virtual network 210 may progress a development update from a first sub-stage of development of a first stage of development at first development virtual network 215 to a second sub-stage of development of the first stage of development at second development virtual network 215. In some implementations, build virtual network 215 may omit a stage of development. For example, for a development update determined to be time-sensitive, build virtual network 215 may progress a development update from QAT virtual network 220 to staging virtual network 230 without testing the development update via E2E virtual network 225.

In some implementations, build virtual network 215 may progress multiple development updates concurrently. For example, build virtual network 215 may cause a first development update and a second development update to be tested via first development virtual network 215, a third development update to be tested via second development virtual network 215, and a fourth development update to be tested via QAT virtual network 220. In this case, build virtual network 215 may cause code from the fourth development update to be integrated into the first, second, and third development update when the fourth development update is implemented and without causing the first, second, and third development updates to return to a previous stage of development.

In some implementations, the build server may store the program code, perform authentication of the program code (e.g., determine that the user is authorized to provide the program code for the web platform), perform version control on the program code, perform documentation of the program code, perform security scanning of the program code (e.g., determining that the program code lacks malicious code), or the like. In some implementations, build virtual network 210 may facilitate establishment of a virtual machine with which a user may control authentication of the program code, version control of the program code, or the like.

In some implementations, cloud network 120 may scale computing resources to facilitate performing authentication of the program code, version control of the program code, or the like. For example, when the program code is provided for scanning, cloud network 120 may allocate a first quantity of computing resources to build virtual network 210 to perform scanning and when scanning is completed, cloud network 120 may assign a second quantity of computing resources to build virtual network 210. Additionally, or alternatively, a scaling controller of cloud network 120 may scale computing resources to facilitate performing one or more tests on a development update (e.g., on the program code). For example, when development virtual network 215 is directed to perform one or more tests on the program code, the scaling controller may allocate a first quantity of computing resources to development virtual network 215 and when development virtual network 215 has competed the one or more tests, the scaling controller may allocate a second quantity of computing resources, to development virtual network 215, that is less than the first quantity of computing resources.

Based on separating the functionalities of program code testing into multiple different virtual networks, cloud network 120 may increase security of program code testing relative to performing testing on a single computing device, however, establishing multiple different virtual networks may be resource intensive. Based on utilizing cloud-based scaling of computing resources, cloud network 120 may achieve security benefits associated with separating program code testing into multiple different virtual networks and reduce resource allocation, by allocating computing resources to each virtual network on an as-needed basis relative to allocating resources to each virtual network on a fixed basis.

As shown by reference number 240, the build server may provide a copy of the program code to a development server of development virtual network 215 (e.g., via a virtualized network link). In some implementations, the development server may perform one or more tests on the program code. For example, the development server may utilize a set of use cases to test the program code and determine whether the program code performs as intended. Further to the example, the development server determines that the program code fails the set of use cases. In this case, assume the development server may provide information associated with failing a development test (e.g., a test associated with the set of use cases), such as information identifying a portion of the program code associated with the failure, information identifying a module associated with the failure, information identifying the set of use cases, or the like. Further to the example, the development server may provide information to the build server associated with causing the program code to be rejected. In this case, the program code may be replaced by other program code for testing via development virtual network 215. As another example, the development server may determine that the program code passed the set of use cases, and may provide information, to the build server, indicating that the program code passed the set of use cases, as shown by reference number 245.

Based on receiving information indicating that the program code passed the set of use cases and/or one or more testing criteria of development virtual network 215, the build server of build virtual network 210 may generate information associated with the program code, in some implementations. For example, the build server may provide information indicating that the program code passed the set of use cases and may update information associated with tracking a development lifecycle of the program code. In this case, the build server may cause the information to be provided to a client device being operated by a developer managing program code testing, a data structure tracking the development lifecycle of the program code, or the like. As shown by reference number 250, the build server may provide the program code to a QAT server of QAT virtual network 220 based on receiving information indicating that the program code passed the set of use cases of development virtual network 215.

In some implementations, the QAT server may perform QAT testing on the program code. For example, the QAT server may perform unit testing on the program code, static code analysis, data flow analysis, metrics analysis, code coverage analysis, and/or another type of program code testing. As an example, the QAT server may determine that the program code does not pass on or more QAT tests, and may cause the program code to be rejected by the build server. In this case, when other program code is generated to replace the program code, the build server may perform version control on the program code and the other program code, and may cause the other program code to be provided for testing via development virtual network 215. As another example, the QAT server may determine that the program code passed QAT testing. In this case, the QAT server may provide, to the build server of build virtual network 210, information associated with indicating that the program code passed the QAT testing, such as testing results or the like, as shown by reference number 255.

Based on receiving information indicating that the program code passed the QAT testing and/or one or more testing criteria associated with QAT virtual network 220, the build server of build virtual network 210 may generate information associated with the program code, in some implementations. For example, the build server may provide information, to the client device utilized by the developer, indicating that the program code passed the QAT testing. Additionally, or alternatively, the build server may provide information associated with comparing the program code to other program code based on the QAT testing. As shown by reference number 260, the build server may provide the program code to an E2E server of E2E virtual network 225 based on receiving information indicating that the program code passed the QAT testing.

In some implementations, the E2E server may perform E2E testing on the program code. For example, the E2E server may perform one or more tests associated with determining whether the program code integrates properly with one or more other modules of the web platform (e.g., integration with a Hybris data hub, integration with an Apigee application programming interface (API), or the like). Additionally, or alternatively, the E2E server may determine whether the program code integrates with one or more data structures, one or more network connections, or the like.

In some implementations, the E2E server may determine that that the program code does not pass one or more E2E tests. For example, the E2E server may determine that the program code does not integrate properly with a server associated with the web platform, and may provide information to the build server of build virtual network 210 indicating that the program code does not pass the E2E testing. In this case, the build server may perform version control, provide information regarding the E2E testing, or the like. When build virtual network 210 receives a subsequent version of the program code, the build server may process the subsequent version and provide the processed subsequent version to development virtual network 125, as described above in connection with reference number 240. In some implementations, the E2E server may determine that the program code passes the E2E testing. For example, the E2E server may determine that the program code properly integrates with the server associated with the web platform. In this case, the E2E server may provide, to the build server of build virtual network 210, information associated with indicating that the program code passed the E2E testing, such as testing results or the like, as shown by reference number 265.

Based on receiving information indicating that the program code passed the E2E testing, the build server of build virtual network 210 may generate information associated with the program code, in some implementations. For example, the build server may provide information, to the client device utilized by the developer, indicating that the program code passed the E2E testing, may update information associated with tracking the development lifecycle of the program code, may perform version management for the program code, or the like. Based on the program code passing the E2E testing (e.g., satisfying one or more criteria of E2E virtual network 225), the build server may provide the program code to a staging server of staging virtual network 230, as shown by reference number 270.

In some implementations, the staging server may facilitate pre-production evaluation of program code, such as by testing incorporation of the program code into a module that is utilized in production virtual network 235. For example, staging virtual network 230 may correspond to and/or resemble production virtual network 235 (e.g., a virtual network associated with the web platform), and the staging server may execute the program code to determine whether the program code will operate as intended when utilized by the module in production virtual network 235. In some implementations, the staging server may perform a set of pre-production tests on the program code. For example, the staging server may facilitate user experience testing, user acceptance testing, compatibility testing (e.g., determining whether the program code is compatible with hardware and/or software configurations of production virtual network 235), or the like.

In some implementations, the staging server may perform performance testing of program code. For example, the staging server may execute the program code to determine a set of performance metrics relating to the program code, such as a metric relating to page views (e.g., a quantity of page views per hour that can be received when utilizing the program code, a quantity of page views per hour that are received when utilizing the program code, an average page views per second metric, a quantity of application programming interface calls per page view, a peak transactions per second (TPS) value, etc.), a metric relating to memory resources (e.g., a quantity of memory required to store the program code, to store information generated based on executing the program code, etc.), a metric relating to processing resources (e.g., a quantity of processing resources utilized when executing the program code), or the like. In this way, the staging server may provide feedback regarding performance of the program code. In some implementations, program code may be rejected when a performance threshold is not satisfied. In some implementations, a portion of program code may be selected from a set of portions of program code based on respective performance metrics associated with the set of portions of program code.

In some implementations, the staging server may provide, to a build server of build virtual network 210, information indicating that the program code does not pass a set of pre-production tests. For example, the staging server may indicate that the program code caused undesired behaviors in a version of the web platform associated with staging virtual network 230 corresponding to and/or resembling the web platform associated with production virtual network 235. In this case, the build server may cause other program code to be provided for testing via development virtual network 215 as a potential replacement for the program code. In some implementations, the staging server may provide information indicating that the program code passed the set of pre-production tests. For example, the staging server may provide information indicating that the program code satisfies a set of user experience thresholds, a set of performance threshold, or the like, as shown by reference number 275.

Based on receiving information indicating that the program code passed the set of pre-production tests and/or satisfied one or more testing criteria associated with staging virtual network 230, the build server of build virtual network 210 may generate information associated with the program code, in some implementations. For example, the build server may provide information, to the client device utilized by the developer, indicating that the program code passed the set of pre-production tests, may update information associated with tracking the development lifecycle of the program code, may perform version management for the program code, or the like. In some implementations, the build server may cause the program code to be scheduled for integration into production virtual network 235 (e.g., to the web platform associated with production virtual network 235). For example, the build server may add the program code to a scheduled update, may provide information indicating that the program code is in a condition that is ready for release, or the like.

As shown by reference number 280, based on the program code passing tests associated with development virtual network 215, QAT virtual network 220, E2E virtual network 225, and staging virtual network 230, build virtual network 210 may cause the program code to be provided to a production server of production virtual network 235 for utilization with the web platform. For example, the build server may cause a portion of the web platform to be adjusted to integrate the program code.

If at any stage, build virtual network 210 receives information indicating that the program code has not passed a set of tests and build virtual network 210 receives a subsequent version of the program code, the build server may process the subsequent version of the program code and provide the processed subsequent version of the program code to development virtual network 215. In this way, build virtual network 210 may ensure that a subsequent version of the program code has not been altered in a way that causes the subsequent version to fail the set of tests and/or another set of tests that are intended to be performed on program code.

In this way, a build virtual network may utilize a hub-and-spoke configuration to facilitate development, testing, and integration of program code for a web platform. By centralizing administration of the development, testing, and integration of the program code with the build virtual network, the build virtual network may facilitate improved authentication of program code, reduced likelihood of misuse or misrepresentation of program code, improved version control for the program code, improved documentation of the program code, improved security scanning for the program code, or the like relative to a non-centralized environment. By utilizing different virtual networks for each phase of testing, the build virtual network may reduce, relative to a single testing environment, a likelihood of malicious alteration of a testing environment to cause malicious program code to pass tests of the testing environment.

As indicated above, FIG. 2 is provided merely as an example. Other examples are possible and may differ from what was described with regard to FIG. 2.

Figure 3:
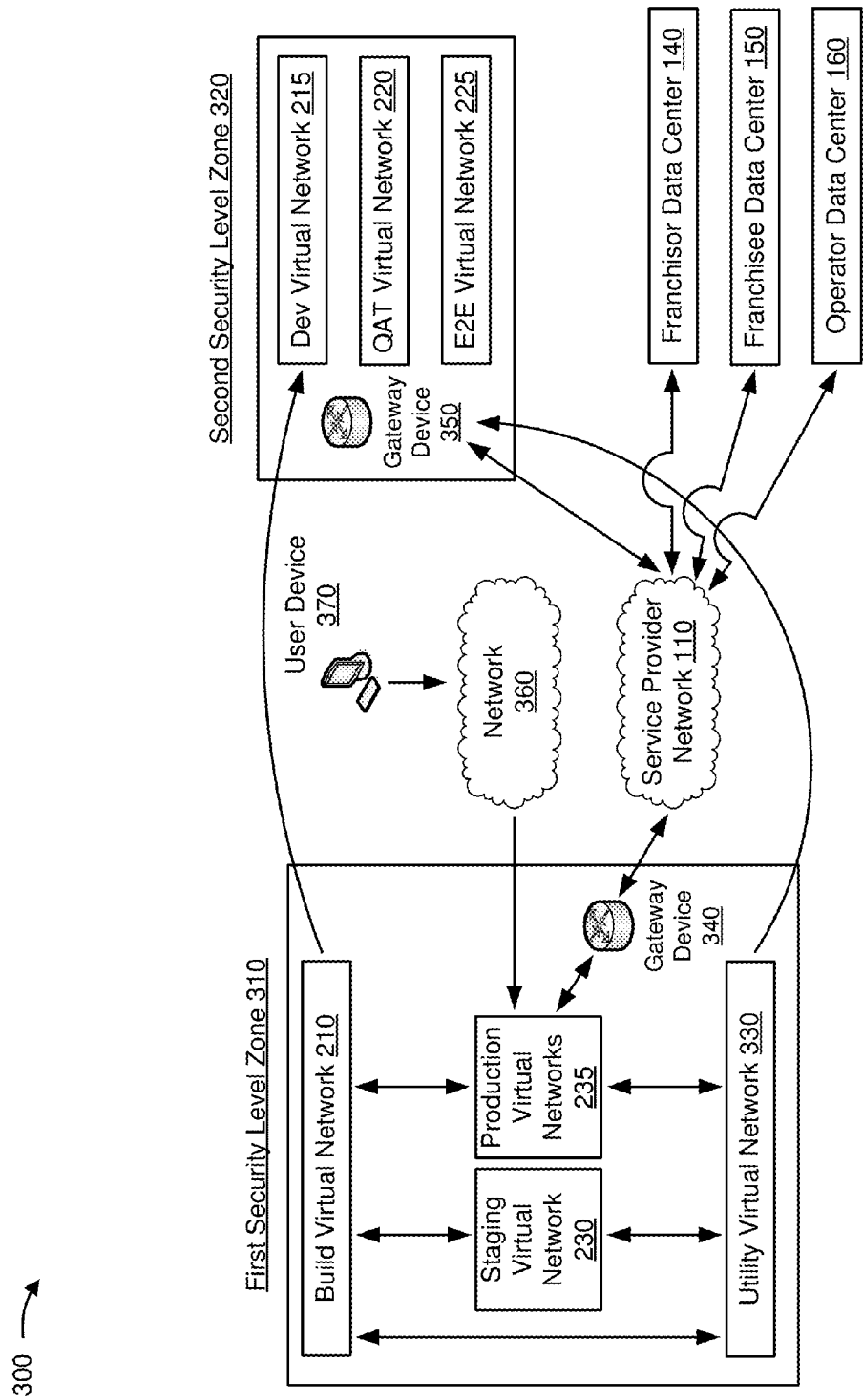
FIG. 3 is a diagram of a set of security level zones relating to the example environment shown in FIG. 1.

FIG. 3 is a diagram of an example implementation 300 illustrating a set of security level zones relating to the example environment shown in FIGS. 1 and 2.

As shown in FIG. 3, a conceptual illustration of portions of example environment 100 may include a first security level zone 310 and a second security level zone 320. A security level zone may refer to a zone (e.g., a conceptual representation of a set of portions of cloud network 120, cloud network 130, or the like) satisfying a particular level of security. For example, first security level zone 310 may include portions of cloud network 120 satisfying compliance with payment card industry data security standard (PCI compliance), compliance with personally identifiable information data security standard (PII compliance), or the like and second security level zone 320 may include portions of cloud network 120 not satisfying PCI compliance, PII compliance, or the like.

In some implementations, first security level zone 310 may include build virtual network 210, staging virtual network 230, production virtual network 235, a utility virtual network 330 (e.g., a virtual network providing one or more functionalities for one or more other virtual networks, such as providing a set of security utilities, a code documentation utility, or the like), and a gateway device 340. For example, each of build virtual network 210, staging virtual network 230, production virtual network 235, utility virtual network 330, and gateway device 340 may be configured to be PCI compliant. In some implementations, second security level zone 320 may include development virtual network 215, QAT virtual network 220, E2E virtual network 225, and a gateway device 350. For example, each of development virtual network 215, QAT virtual network 220, E2E virtual network 225, and gateway device 350 may be configured without PCI compliance.

Utility virtual network 330 may refer to a virtual network (e.g., of cloud network 120, cloud network 130, or the like) associated with providing utilities for one or more other virtual networks. For example, utility virtual network 330 may include a set of tools, such as a security tool (e.g., a malicious file scanning tool, a file integrity monitoring tool, a logging tool, or the like), that may be utilized by computing resources of one or more other portions of cloud network 120. In this case, a server of a portion of production virtual network 235 may utilize a malicious file scanning tool of utility virtual network 330 to determine whether a received file is a malicious file.

In some implementations, cloud network 120 may allocate a quantity of computing resources to utility virtual network 330 for a terminal services module that provides remote computer and virtual machine control to a remote user, such as a developer operating a client device of operator data center 160 or the like. In some implementations, the terminal services module may be associated with a firewall. For example, the terminal services module may be associated with a network security group (NSG) firewall (e.g., a top level object associated with a set of access control rules) utilized to determine whether to allow traffic to a virtual machine, such as the terminal services module. In some implementations, utility virtual network 330 may be designated for PCI compliance based on utilization of tools of utility virtual network 330 by multiple virtual networks that are PCI compliant. In this way, cloud network 120 may avoid an exploit of utility virtual network 330 being utilized to gain access to PCI information of a PCI compliant virtual network.

In some implementations, first security level zone 310 may utilize a different authorization compared with second security level zone 320. For example, gateway device 340 may utilize multi-factor authentication, such as two or more of a knowledge security element (e.g., a password, a personal identification number, an answer to a security question), a possession security element (e.g., a security token), a user security element (e.g., a fingerprint identification, a retina identification, a voice identification), or the like. By contrast, gateway device 350 may utilize single-factor authentication. In this way, first security level zone 310 may provide a higher level of security for virtual networks associated therewith than second security level zone 320. Providing a higher level of security may be more resource intensive, less flexible, or the like relative to a lower level of security. Cloud network 120 and/or cloud network 130 may utilize the higher level of security for virtual networks associated with the web platform to avoid inadvertent disclosure of customer data, malicious alteration to the web platform, or the like, thereby resulting in an enhanced security condition relative to a non-PCI compliant web platform. Moreover, cloud network 120 and/or cloud network 130 may utilize the lower level of security for testing environments, thereby, relative to requiring PCI compliance for testing environments, reducing resource allocation and increasing flexibility for testing environments, in which security information is less likely to be located and with which customers do not interact.

In some implementations, first security level zone 310 (e.g., portion of cloud network 120 conceptually represented as included in first security level zone 310) may receive traffic from network 360 (e.g., Internet traffic from a customer utilizing user device 370 to place an order with production virtual network 235 via the web platform), such as an order for food delivery via a food delivery web platform or another type of product delivery via another type of web platform. User device 370 may include one or more devices, such as a mobile phone, a computer, a video game console, or another type of device that may be utilized to access a web platform. Additionally, or alternatively, first security level zone 310 may receive traffic from service provider network 110 via gateway device 340 (e.g., a terminal services device receiving virtual private network traffic from a developer associated with franchisor data center 140, franchisee data center 150, and/or operator data center 160).

In some implementations, second security level zone 320 may receive traffic from service provider network 110 and from first security level zone 310 (e.g., program code promoted from build virtual network 210, utility functionalities from utility virtual network 315, or the like). For example, program code may be promoted from build virtual network 210 to development virtual network 215, QAT virtual network 220, and/or E2E virtual network 225. In this case, second security level zone 320 may serve as a sandbox environment for a set of developers to test program code without granting administrative access to virtual networks of first security level zone 310 that may include sensitive user information and/or access to critical resources of the web platform. Moreover, second security level zone 320 does not receive traffic from network 360, thereby facilitating the lessened security requirements relative to first security level zone 310, which does receive traffic from network 360.

In this way, a cloud network may improve web platform management for a multi-developer organizations by providing improved information security and by reducing a likelihood of malicious or inadvertent errors being propagated to the web platform relative to a cloud network that does not implement PCI compliance for virtual networks. Moreover, the cloud network may improve web platform management by providing improved flexibility regarding granting access for program code testing relative to a cloud network that implements PCI compliance for all virtual networks.

As indicated above, FIG. 3 is provided merely as an example. Other examples are possible and may differ from what was described with regard to FIG. 3.

Figure 4A:
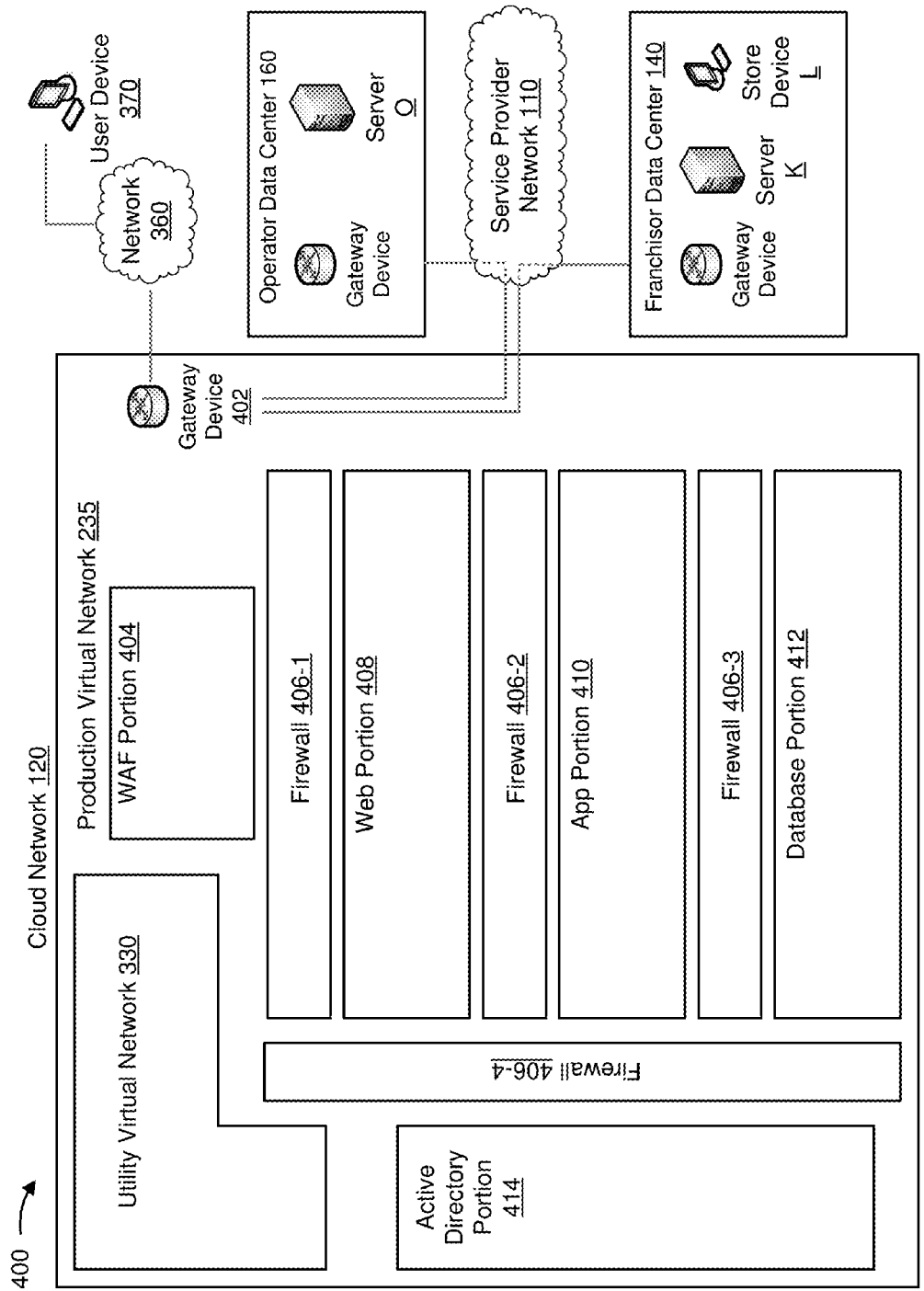
FIGS. 4A and 4B are diagrams of an example of a multi-layer security architecture with firewalled portions of a virtual network relating to the example environment shown in FIG. 1.
Figure 4B:
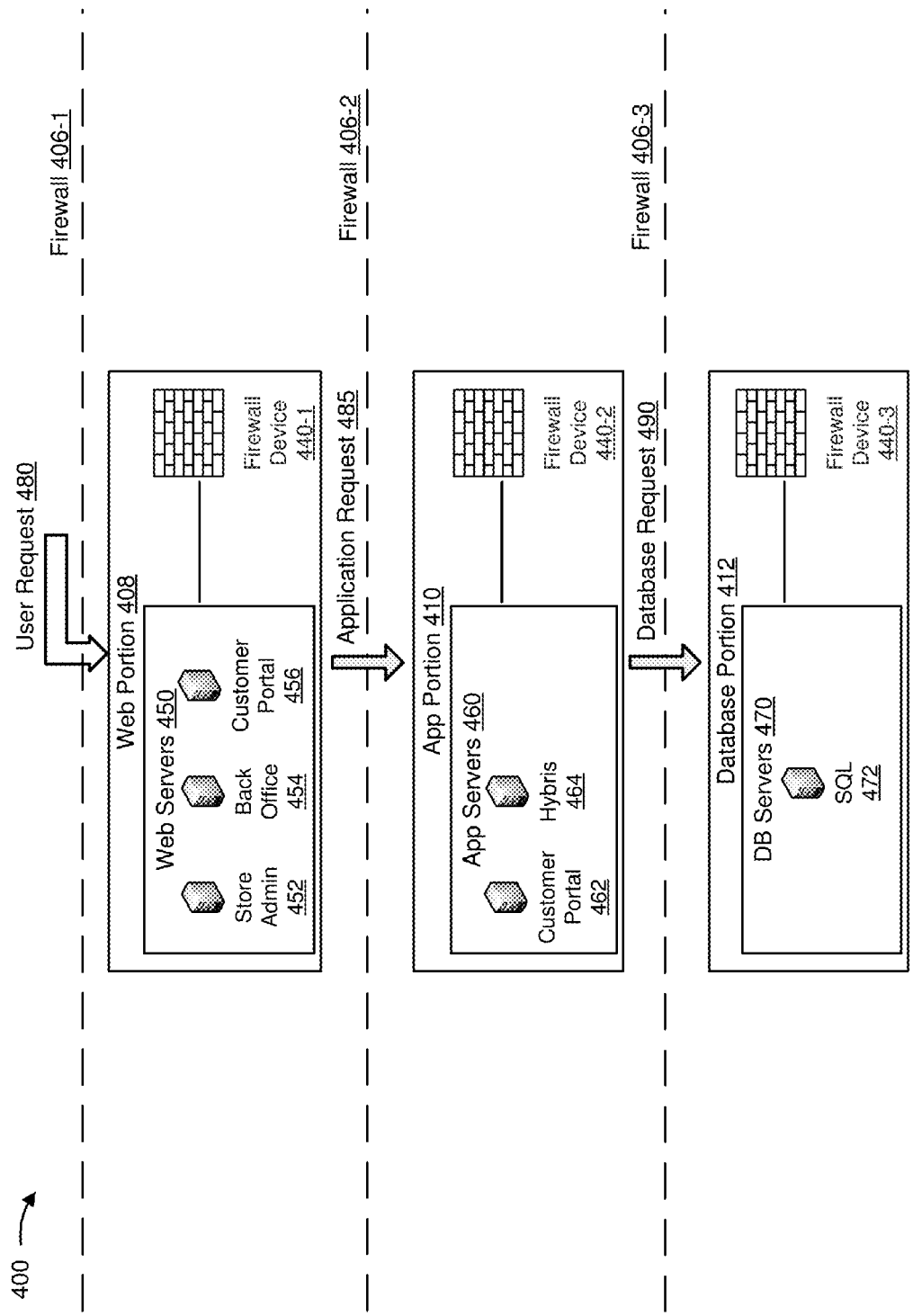

FIGS. 4A and 4B are diagrams of an example implementation 400 relating to example environment 100 shown in FIG. 1. FIGS. 4A and 4B show an example of a multi-layer security architecture with firewalled portions of a virtual network.

As shown in FIG. 4A, cloud network 120 may include production virtual network 235, a utility virtual network 330, and a gateway device 402. Production virtual network 235 may include a web application firewall (WAF) portion 404, a group of firewall 406-1 through 406-4, a web portion 408 (e.g., a web server portion of production virtual network 235), an application ("app") portion 410 (e.g., an application server portion of production virtual network 235), a database portion 412 (e.g., a database server portion of production virtual network 235), and an active directory portion 414. Cloud network 120 may connect, via gateway device 402, to network 360 and service provider network 110. Portions of production virtual network 235 may integrate security tools of utility virtual network 330, which may be conceptually represented and/or instantiated as a utility portion of production virtual network 235. In some implementations, production virtual network 235 may include a scaling controller associated with allocating computing resources to portions of production virtual network 235, a routing device associated with causing information to be routed between portions of production virtual network 235, or the like.

Gateway device 402 may include one or more gateway devices associated with providing traffic routing for production virtual network 235. For example, gateway device 402 may receive virtual private network (VPN) traffic from operator data center 160 (e.g., via service provider network 110) and may route the VPN traffic to a terminal services device of utility virtual network 330. Additionally, or alternatively, gateway device 402 may receive traffic from network 360 (e.g., web traffic), operator data center 160, franchisor data center 140, or the like and may route the traffic to a portion of cloud network 120 (e.g., web portion 408).

WAF portion 404 may include one or more devices associated with providing firewalling for production virtual network 235. For example, WAF portion 404 may include a virtual network (e.g., a sub-virtual network of production virtual network 235) that may receive network traffic from gateway device 402, and may apply a security filter. In this way, WAF portion 404 may reduce a likelihood of a cross-site scripting (XSS) attack, a structured query language (SQL) injection attack, or the like. Based on the traffic satisfying the filter and/or one or more traffic routing criteria of WAF portion 404, the traffic may be routed, via firewall 406-1, to web portion 408, as described in detail with regard to FIG. 4B. In some implementations, WAF portion 404 may perform reverse proxying for user device 370 or the like. For example, when user device 370 attempts to establish a connection, via WAF portion 404, to a customer portal of web portion 408, WAF portion 404 may establish a first connection with user device 370 and a second separate connection with web portion 408, thereby preventing user device 370 from direct access to web portion 408. In this way, WAF portion 404 may provide a layer of security for the web platform. By utilizing cloud-based scaling, cloud network 120 may provide the layer of security on an as needed basis, thereby reducing a resource allocation relative to a fixed allocation for a WAF.

Firewall 406 (hereinafter referred to collectively as "firewalls 406," and individually as "firewall 406") may refer to a firewall associated with providing a layer of security for cloud network 120. For example, firewall 406 may include a network security group (NSG) based firewall associated with managing access between computing resources of portions of cloud network 120. For example, when user device 370 provides information identifying an order for food delivery via WAF portion 404 (e.g., based on satisfying one or more security criteria of WAF portion 404), firewall 406-1 may provide one or more firewall-based filters on the connection established between WAF portion 404 and web portion 408. Similarly, when a server of web portion 408 intends to access information of a server of application portion 410, firewall 406-2 may apply one or more filtering rules to a request for information. In some implementations, firewall 406 may include a virtualized firewall. For example, cloud network 120 may allocate resources to firewalls 406 on an as needed basis, thereby reducing a resource allocation requirement per firewall than a fixed allocation. Moreover, based on reducing the resource allocation requirement per firewall, cloud network 120 may implement more firewalls for separation portions of cloud network 120 than a similar cloud network that is associated with a greater resource allocation requirement per firewall.

Web portion 408 may refer to a portion of cloud network 120 associated with providing information for display via a web platform and/or receiving information from the web platform. For example, a user may request information from cloud network 120 via a web platform by providing a user request to web portion 408, as described herein with regard to FIG. 4B.

Application portion 410 may refer to a portion of cloud network 120 associated with providing application services for the web platform. For example, when web portion 408 receives an order for a food product delivery, web portion 408 may provide the order to application portion 410 for processing, as described herein with regard to FIG. 4B.

Database portion 412 may refer to a portion of cloud network 120 associated with providing information from a database for the web platform. For example, when application portion 410 is processing the order for the food product delivery, application server 410 may request information (e.g., user identification information, credit card information, or the like from database portion 414 via a database request, and database portion 410 may provide the requested information, as described herein with regard to FIG. 4B.

Active directory portion 414 may refer to a portion of cloud network 120 associated with providing directory services, authentication, and/or authorization for users of cloud network 120. For example, cloud network 120 may allocate a quantity of computing resources to an active directory domain controller of active directory portion 414. Active directory portion 414 may provide another layer of security for cloud network 120, in some implementations. For example, active directory portion 414 may ensure that administrative users (e.g., one or more users of operator data center 160) are only granted access to assigned portions of cloud network 120. In this case, active directory portion 414 may receive an access request from a user and perform authentication of the access request to determine whether to grant access (e.g., to a portion of production virtual network 235) to the user.

As shown in FIG. 4B, web portion 408, application portion 410, and database portion 412 may include firewall devices 440-1, 440-2, and 440-3, respectively. A firewall device 440 may correspond to a firewall 406, may include an interface with a firewall 406, or may include a device separate and/or different from a firewall 406. For example, firewall device 440 may include a virtualized firewall device allocated as a computing resource of web portion 408 (e.g., firewall device 440-1), application portion 410 (e.g., firewall device 440-2), database portion 412 (e.g., firewall device 440-3), or the like. Firewall device 440 may provide a layer of security for a portion of cloud network 120. For example, when a connection is attempted to web portion 408, firewall device 440-1 may apply one or more filters and/or security techniques associated with ensuring that the connection is a not associated with a malicious purpose.

As further shown in FIG. 4B, web portion 408 may include a set of web servers 450 associated with one or more functionalities of the web platform. For example, the set of web servers 450 may include a group of store administration ("admin") servers 452 (e.g., 5 servers, 10 servers, 20 servers, etc.) that provide a portal for utilization one or more functionalities of the web platform associated with store administration. Additionally, or alternatively, the set of web servers 450 may include a group of back office servers 454 that provide a portal for utilization of one or more back office functionalities of the web platform, such as inventory information, payroll information, or the like. Additionally, or alternatively, the set of web servers 450 may include a group of customer portal servers 456 (e.g., one or more web servers) that provide a portal for utilization of one or more customer functionalities of the web platform. For example, user device 370 may provide web traffic (e.g., a request for delivery or take-out of a product, such as a food product) to customer portal servers 456 (e.g., via WAF portion 404).

As further shown in FIG. 4B, application portion 410 may include a set of application ("app") servers 460 associated with one or more application services of an ecommerce application associated with the web platform. For example, the set of application servers 460 may include a group of customer portal servers 462 associated with providing information for customer portal servers 456. Additionally, or alternatively, the set of application servers 460 may include a group of Hybris servers 464 (e.g., data hub servers associated with facilitating the ecommerce application).

As further shown in FIG. 4B, database portion 412 may include a set of database ("DB") servers 470 associated with providing information from one or more data structures for the ecommerce application or the like. In some implementations, the set of database servers 470 may include a group of SQL servers 472.

In some implementations, a server (e.g., a web server 450, an application server 460, a database server 470, or the like) may include one or more security functionalities, such as endpoint protection, antivirus protection, local firewalling, data loss prevention, file modification monitoring, or the like as a layer of security for the server. For example, Hybris server 464 may operate antivirus protection as an added layer of security to firewall device 440-2, firewall 406-2, or the like. In some implementations, the server may provide information identifying a detected malicious action (e.g., an attempted intrusion, a detected malicious file, etc.) for utilization in assessing a security situation as described with regard to FIGS. 8-10.

As further shown in FIG. 4B, and by reference number 480, web portion 408 may receive a user request (e.g., from user device 370). Assume that the user request is for an order for food delivery. The user request is routed (e.g., from WAF portion 404) to customer portal server 456 based on address information (e.g., IP address information) indicating that the request is intended for customer portal server 456. Customer portal server 456 may generate an application request 485 for Hybris server 464. The application request is transmitted to Hybris server 464 (e.g., via firewall 406-2 and firewall device 440-2). Hybris server 464 may fulfill the request (e.g., by generating information for a store device of a store location that is intended to fulfill the order for food delivery). As shown by reference number 490, to fulfill the request, Hybris server 464 may generate a database request for information from SQL server 472. The database request is transmitted to SQL server 472 (e.g., via firewall 406-3 and firewall device 440-3), and SQL server 472 may provide database information associated with fulfilling the request (e.g., user identification information, payment information, preference information, or the like).

In this way, production virtual network 235 is configured with layered security to reduce a likelihood of a security situation causing a harm to production virtual network 235 relative to non-layered security. For example, user device 370 is not permitted to directly access web portion 408, rather WAF portion 404 establishes a reverse proxy connection to web portion 408 based on receiving traffic from user device 370. Similarly, WAF portion 404 may lack permission to access application portion 410, rather WAF portion 404 may transmit information to web portion 408, which may transmit information to application portion 410. Similarly, application portion 410 may request information from database portion 412 to fulfill a request provided by web portion 408, without web portion 408 having direct access to database portion 412.

Production virtual network 235 may utilize scalable computing resources to implement layered security. For example, a quantity of computing resources of production virtual network 235 (e.g., servers established for web portion 408, application portion 410, database portion 412, firewalls 406-1, 406-2, 406-3, and 406-4, or the like) may be scaled to meet demand, thereby facilitating comprehensive layered security with less resource allocation than may be required for a fixed allocation. In this way, cloud network 120 may reduce a likelihood of a security situation relative to another type of web platform using non-scalable computing resources that is, based on using non-scalable computing resources, unable to implement layered security as a result of excessive costs to establish fixed computing resources.

As indicated above, FIGS. 4A and 4B are provided merely as an example. Other examples are possible and may differ from what was described with regard to FIGS. 4A and 4B.

Figure 5A:
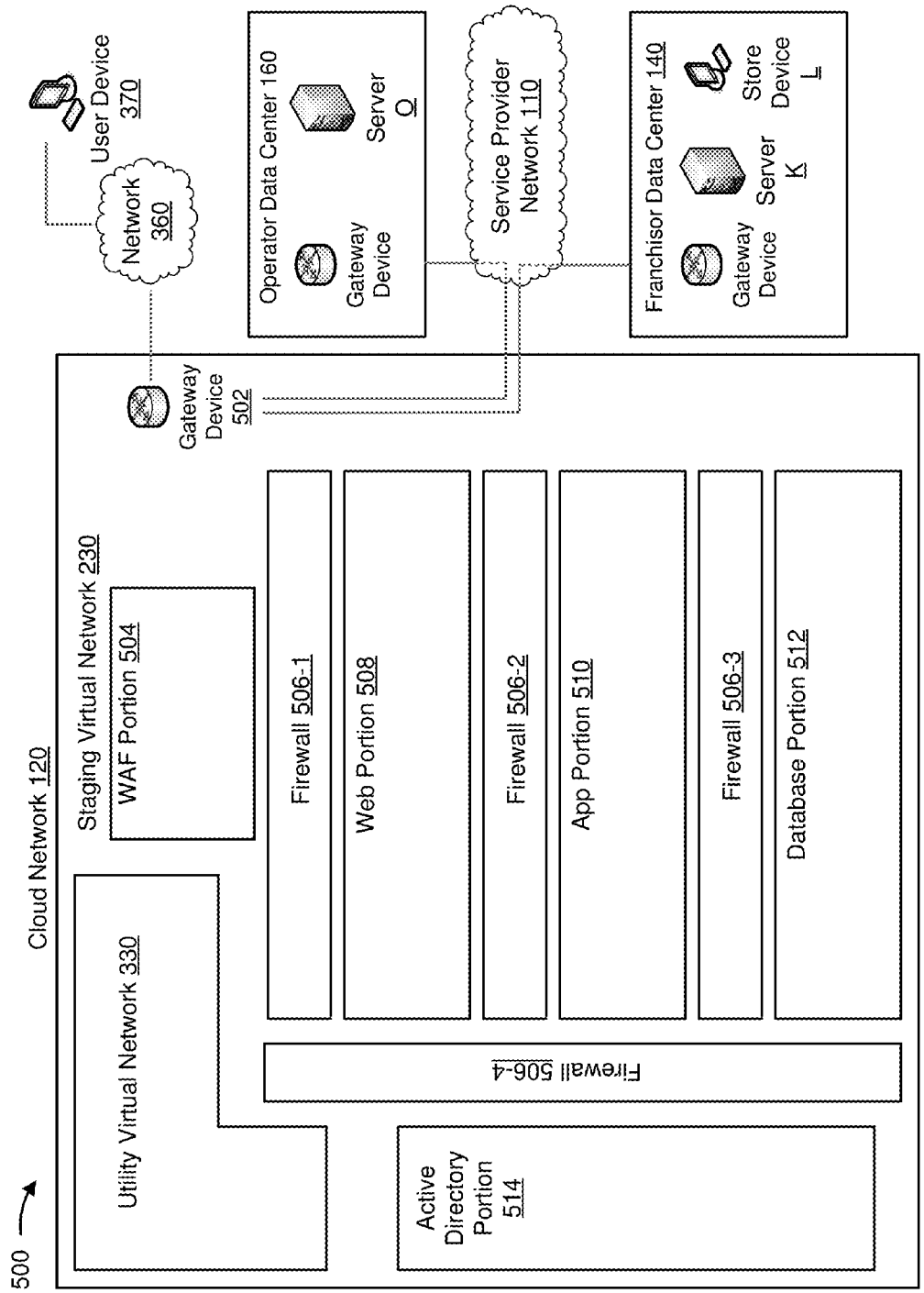
FIGS. 5A and 5B are diagrams of another example of a multi-layer security architecture with firewalled portions of a virtual network relating to the example environment shown in FIG. 1.
Figure 5B:
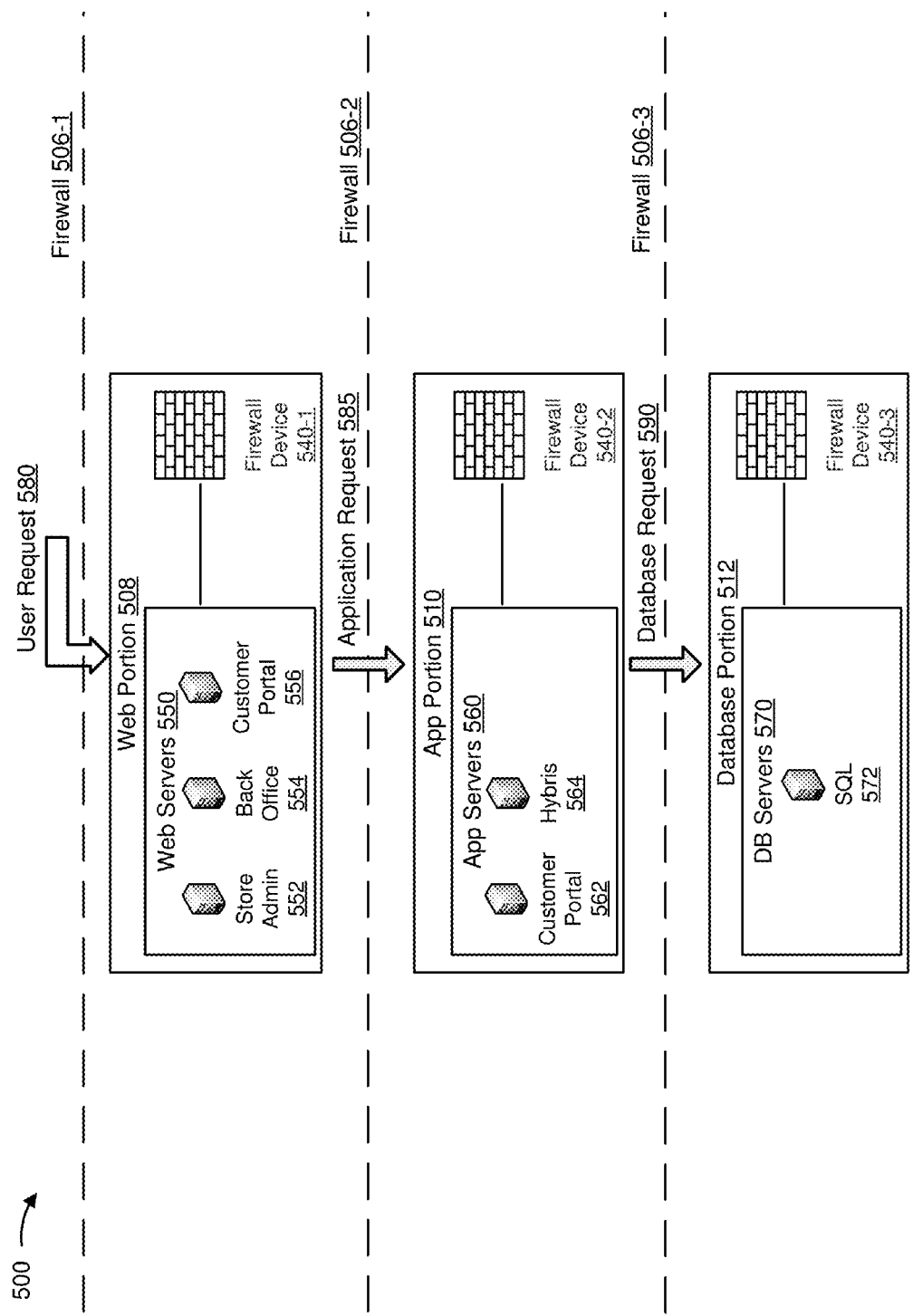

FIGS. 5A and 5B are diagrams of an example implementation 500 relating to example environment 100 shown in FIG. 1. FIGS. 5A and 5B show an example of a multi-layer security architecture with firewalled portions of a virtual network.

FIGS. 5A and 5B show an example of staging virtual network 230 of cloud network 120. As shown in FIGS. 5A and 5B, staging virtual network 230 is configured to correspond to and resemble production virtual network 235, thereby facilitating testing of an alteration to production virtual network 235 (e.g., a new feature, new program code, or the like) prior to implementation of the alteration in production virtual network 235. Staging virtual network 230 is configured with PCI compliance, thereby facilitating determination of whether the change operates as intended in a PCI compliant virtual network, such as production virtual network 235 (testing prior to that which is conducted in staging virtual network 230 may occur in a non-PCI compliant virtual network, such as development virtual network 215, QAT virtual network 220, E2E virtual network 225, or the like).

For example, and with regard to FIG. 5A, gateway device 502 may correspond to gateway device 402, and may perform one or more similar functions. Similarly, WAF portion 504 may correspond to WAF portion 404, and may perform one or more similar functions. Similarly, firewalls 506-1, 506-2, 506-3, and 506-4 may correspond to 406-1, 406-2, 406-3, and 406-4, respectively, and may, respectively, perform one or more similar functions. Similarly, web portion 508 may correspond to web portion 408, and may perform one or more similar functions. Similarly, application ("app") portion 510 may correspond to application portion 410, and may perform one or more similar functions. Similarly, database portion 512 may correspond to database portion 412, and may perform one or more similar functions. Similarly, active directory portion 514 may correspond to active directory portion 414, and may perform one or more similar functions.

As another example, and with regard to FIG. 5B, firewall devices 540-1, 540-2, and 540-3 may correspond to firewall devices 440-1, 440-2, and 440-3, respectively, and may, respectively, perform one or more similar functions. Similarly, web servers 550 (e.g., store administration ("admin") server 552, back office server 554, and customer portal server 556) may correspond to web servers 440 (e.g., store administration server 452, back office server 454, and customer portal server 456), and may perform one or more similar functions. Similarly, application ("app") servers 560 (e.g., customer portal server 562 and Hybris server 564) may correspond to application servers 460 (e.g., customer portal server 462 and Hybris server 464), and may perform one or more similar functions. Similarly, database servers 570 (e.g., SQL server 572) may correspond to database servers 470 (e.g., SQL server 472), and may perform one or more similar functions.

As another example, and with regard to FIG. 5B, web portion 508 may receive a user request 580 corresponding to user request 480, and may generate an application request 585 corresponding to application request 485. Similarly, application portion 510 may receive the application request 585 and may generate database request 590 corresponding to database request 490. Similarly, database portion 512 may receive database request 590 and may provide database information to fulfill database request 590.

As indicated above, FIGS. 5A and 5B are provided merely as an example. Other examples are possible and may differ from what was described with regard to FIGS. 5A and 5B.

Figure 6:
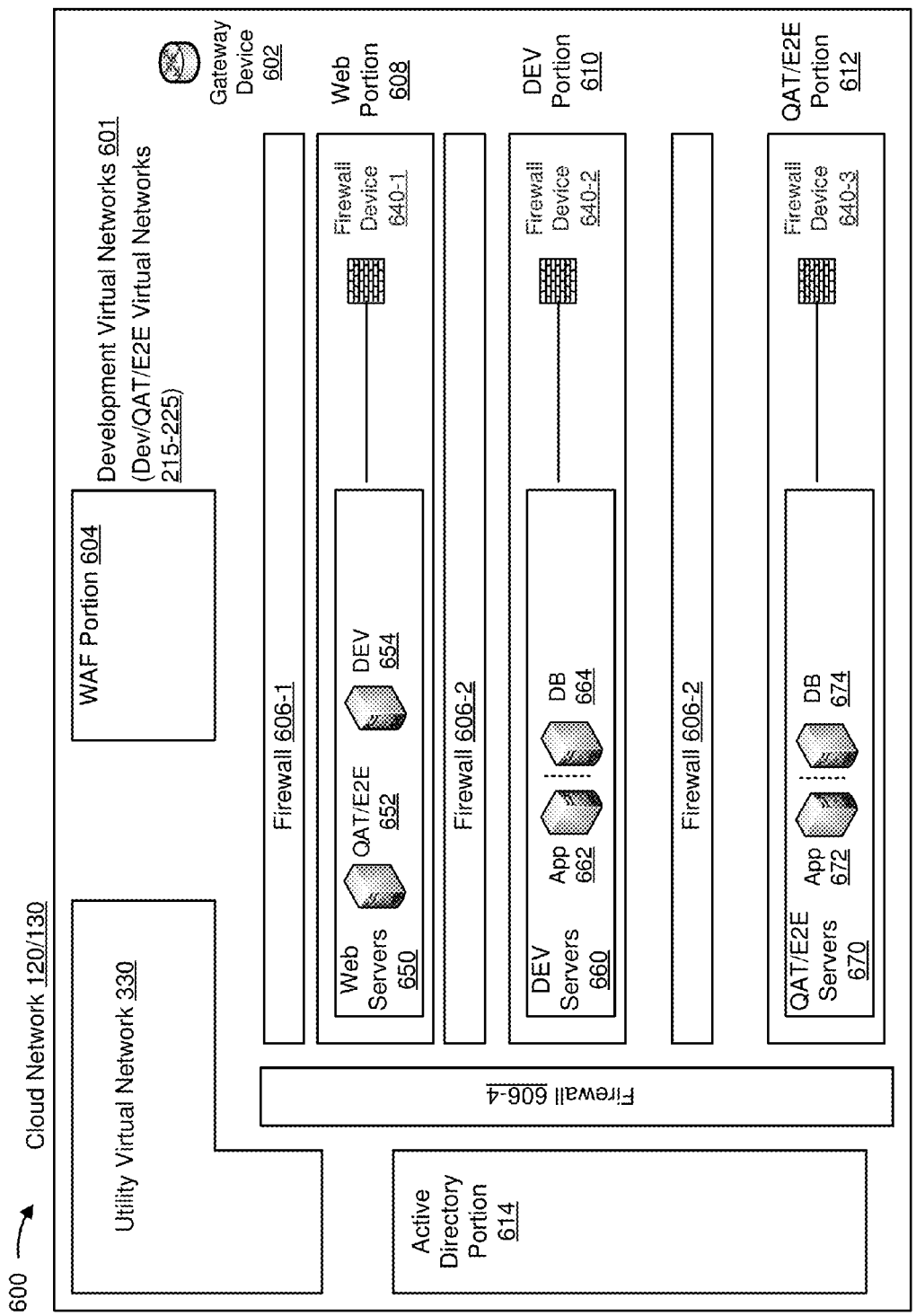
FIG. 6 is a diagram of yet another example of a multi-layer security architecture with firewalled portions of a virtual network.

FIG. 6 is a diagram of an example implementation 600 relating to example environment 100 shown in FIG. 1. FIG. 6 shows an example of a multi-layer security architecture with firewalled portions of a virtual network.

As shown in FIG. 6, cloud network 120 may include a development virtual network 215, a QAT virtual network 220, and/or an E2E virtual network 225, collectively referred to Development virtual networks 601. Development virtual networks 601 may include one or more portions and/or computing resources corresponding to production virtual network 235 of FIGS. 4A and 4B, staging virtual network 504 of FIGS. 5A and 5B, or the like. For example, development virtual networks 601 may include a gateway device 602, a WAF portion 604, a set of firewalls 606, a web portion 608, a development portion 610, a QAT/E2E portion 612, an active directory portion 614, a set of firewall devices 640, or the like.

WAF portion 604 may include one or more devices associated with providing firewalling for development virtual networks 601. For example, WAF portion 404 may include a virtual network (e.g., a sub-virtual network of production virtual network 235) that may receive network traffic from gateway device 402, and may apply a security filter, as described herein with regard to WAF 404 of FIGS. 4A and 4B.

Active directory portion 614 may refer to a portion of cloud network 120 associated with providing directory services, authentication, and/or authorization for users of cloud network 120 and development virtual networks 601. For example, cloud network 120 may allocate a quantity of computing resources to an active directory domain controller of active directory portion 614, as described herein with regard to active director portion 414 of FIGS. 4A and 4B.

As further shown in FIG. 6, web portion 608 may include a firewall device 640-1 and a set of web servers 650 (e.g., a group of QAT/E2E servers 652, a group of development ("DEV") servers 654, or the like). Development portion 610 may include a firewall device 640-2 and a set of development servers 660 (e.g., a group of application servers 662, a group of database servers 664, or the like). In some implementations, application servers 662 may be incorporated into an application server virtual network and database servers 664 may be incorporated into a database virtual network, each of which are sub-virtual networks of development portion 610. QAT/E2E portion 612 may include a firewall device 640-3 and a set of QAT/E2E servers 670 (e.g., a group of application servers 672, a group of database servers 674, or the like). In some implementations, application servers 672 may be incorporated into an application server virtual network and database servers 674 may be incorporated into a database virtual network, each of which are sub-virtual networks of QAT/E2E portion 618. In some implementations, QAT/E2E portion 612 may include a QAT sub-portion that includes a set of application servers 672, a set of database servers 674, or the like and an E2E sub-portion that includes a set of application servers 672, a set of database servers 674, or the like.

As indicated above, FIGS. 6A and 6B are provided merely as an example. Other examples are possible and may differ from what was described with regard to FIGS. 6A and 6B.

Figure 7:
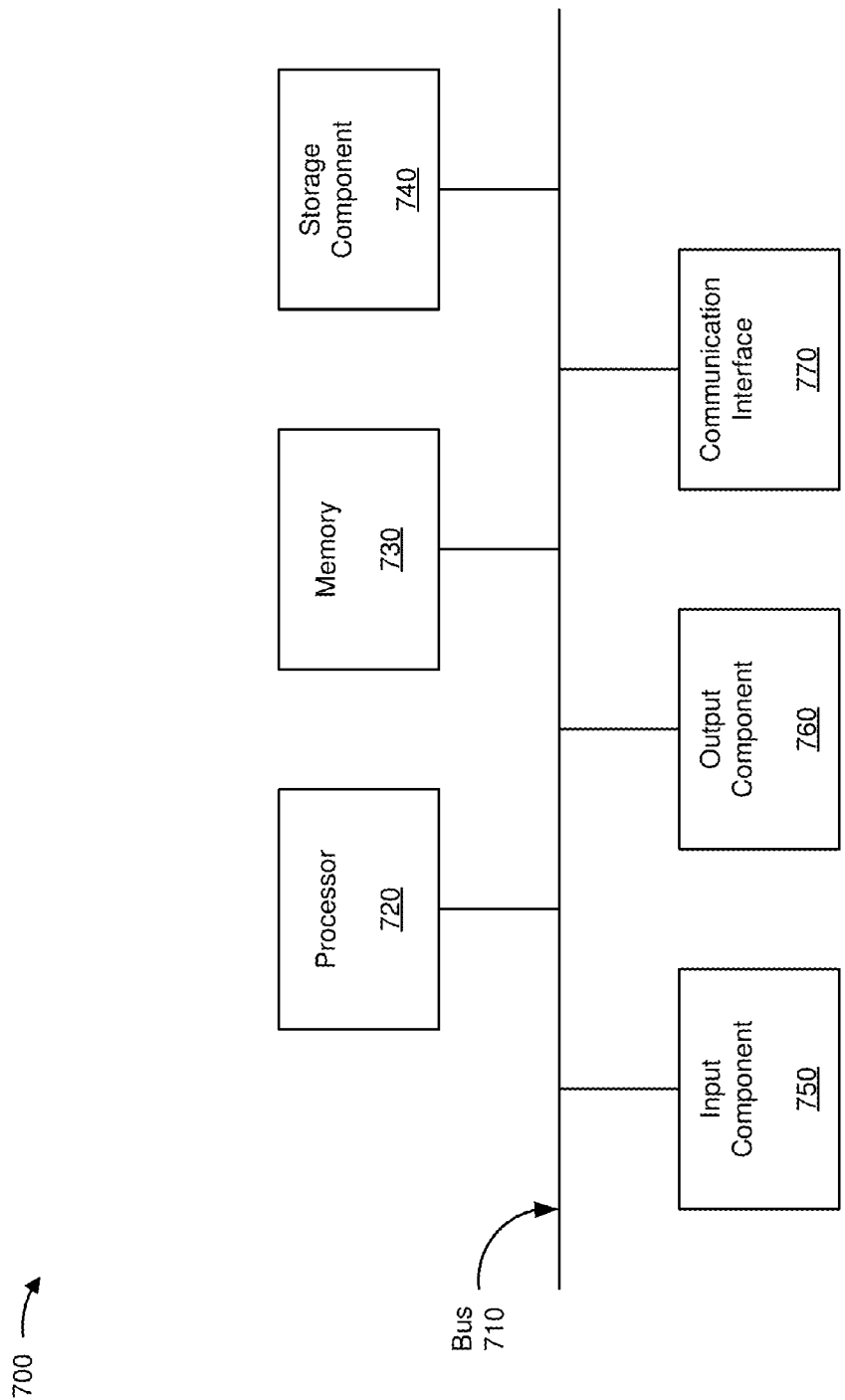
FIG. 7 is a diagram of example components of one or more devices and/or computing resources described herein.

FIG. 7 is a diagram of example components of a device 700. Device 700 may correspond to one or more devices and/or computing resources described herein (e.g., a device and/or a computing resource of FIGS. 1-6, FIGS. 8-10, or the like). In some implementations, one or more devices and/or computing resources described herein may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 may include a component that permits communication among the components of device 700. Processor 720 is implemented in hardware, firmware, or a combination of hardware and software. Processor 720 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 730 may include random access memory (RAM), a read only memory (ROM), and/or another type of dynamic or static storage device (e.g., a flash memory, a magnetic memory, an optical memory, etc.) that stores information and or instructions for use by processor 720.

Storage component 740 may store information and/or software related to the operation and use of device 700. For example, storage component 740 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 750 may include a component that permits device 700 to receive information, such as via user input (e.g., a touch screen display, a keyboard, a keypad, a mouse, a button, a switch, a microphone, etc.). Additionally, or alternatively, input component 750 may include a sensor for sensing information (e.g., a global positioning system (GPS) component, an accelerometer, a gyroscope, an actuator, etc.). Output component 760 may include a component that provides output information from device 700 (e.g., a display, a speaker, one or more light-emitting diodes (LEDs), etc.).

Communication interface 770 may include a transceiver-like component (e.g., a transceiver, a separate receiver and transmitter, etc.) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
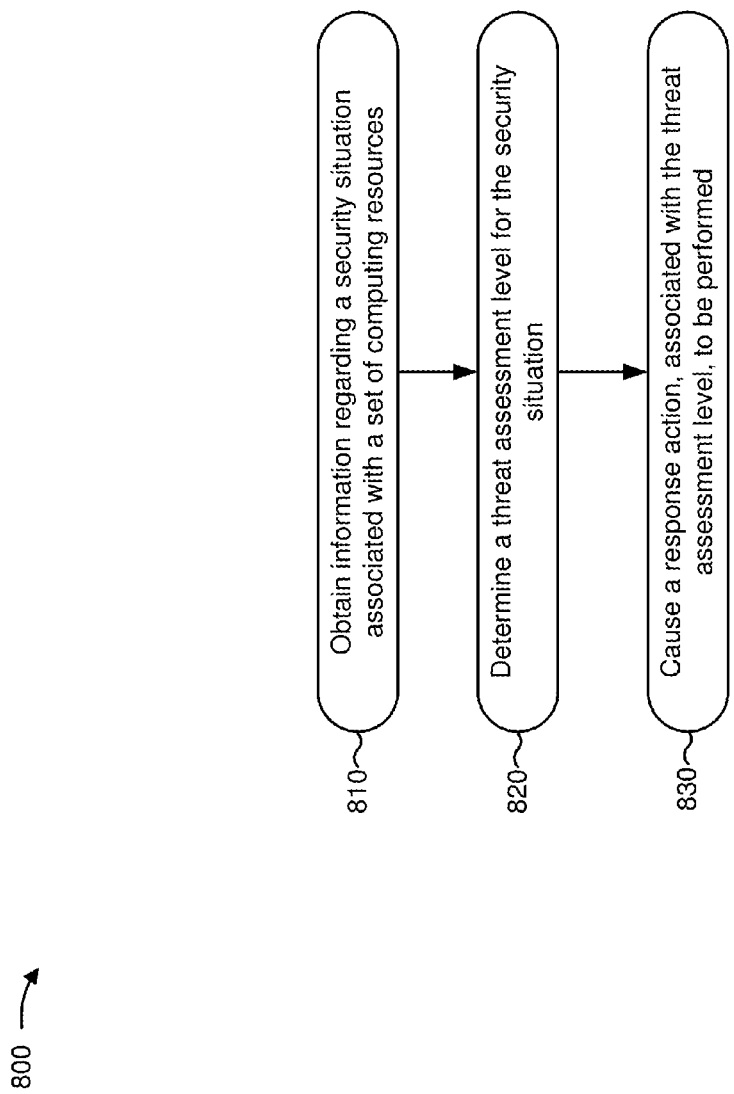
FIG. 8 is a flow chart of an example process for performing a security assessment.

FIG. 8 is a flow chart of an example process 800 for performing a security assessment. In some implementations, one or more process blocks of FIG. 8 may be performed by a security assessment device 165. In some implementations, one or more process blocks of FIG. 8 may be performed by another device or a group of devices separate from or including security assessment device 165, such as one or more other devices and/or computing resources described herein (e.g., a device and/or a computing resource of FIGS. 1-6, FIGS. 9-10, or the like).

As shown in FIG. 8, process 800 may include obtaining information regarding a security situation associated with a set of computing resources (block 810). For example, security assessment device 165 may obtain information regarding the security situation. In some implementations, security assessment device 165 may obtain the information regarding an ongoing security threat. Additionally, or alternatively, security assessment device 165 may obtain the information regarding a potential security threat.

In some implementations, security assessment device 165 may determine information based on one or more layers of security associated with a cloud-based web platform, such as a web platform associated with cloud network 120 and cloud network 130. For example, a security assessment tool (e.g., a malicious file detection tool, a malicious code injection tool, or the like) associated with utility virtual network 330 may be utilized by a server of production virtual network 235 to analyze incoming traffic, may determine that the incoming traffic is associated with a malicious purpose (e.g., a distributed denial of service (DDOS) attack, a malicious code injection attack, or the like). In this case, the server may provide, to security assessment device 165, information associated with analyzing the incoming traffic. In some implementations, security assessment device 165 may obtain the information from a particular security assessment tool. For example, security assessment device 165 may obtain information from a server of cloud network 120, a WAF of cloud network 120, a firewall of cloud network 120, or the like that is executing security information and event management (STEM) software, host-based intrusion detection system (HIDS) software, network intrusion detection systems (NIDS) software, data loss prevention security software, Tripwire security software, event logging software, system alarm software, or the like. Additionally, or alternatively, security assessment device 165 may receive information from a threat intelligence provider and/or an Internet resource, such as Symantec DeepSight, United States Computer Emergency Readiness Team (US-CERT), InfraGuard, the Internet Storm Center (ISC), or the like. For example, security assessment device 165 may receive information regarding a network traffic pattern, a malicious file, a type of malicious file, a patch for an exploit, a recovery path for an exploit, a threat of an attack (e.g., provided via a communication channel being monitored by the threat intelligence provider and/or the Internet resource), or the like.

In some implementations, security assessment device 165 may receive information regarding a particular event. For example, security assessment device 165 may receive information identifying an event associated with a risk of malicious attack (e.g., a new discount offered via the web platform, a news event related to a company associated with the web platform, a world news event, a sports event, a holiday, or the like). Additionally, or alternatively, security assessment device 165 may receive information based on performing a targeted vulnerability assessment, such as information identifying an exploit associated with the web platform. Additionally, or alternatively, security assessment device 165 may receive information associated with an operational incident, such as a server becoming deactivated, a new data center associated with the web platform, a public threat made regarding the web platform, a detection of surveillance associated with the web platform, or the like.

As further shown in FIG. 8, process 800 may include determining a threat assessment level for the security situation (block 820). For example, security assessment device 165 may select a threat assessment level from a set of threat assessment levels. A threat assessment level may refer to a classification of a security situation into a discrete category associated with a set of response actions. For example, the security situation may be classified into a normal level (e.g., a normal security situation), an elevated level (e.g., a security situation with an elevated threat relative to the normal level), or the like. In some implementations, security assessment device 165 may perform an evaluation of the information regarding the security situation when determining the threat assessment level. For example, security assessment device 165 may classify the security situation as being related to a known threat (e.g., a known malicious software), an unknown threat (e.g., an unknown malicious software), or the like.

In some implementations, security assessment device 165 may determine a specificity associated with the security situation. For example, prior to a commercial event, security assessment device 165 may determine the security situation to be a non-specific security situation (e.g., a threat may relate to the commercial event but no direct threat has been received). By contrast, when a threat of a DDOS attack is received (e.g., via a communication channel) with regards to the web platform, security assessment device 165 may determine the security situation to be related to a higher degree of specificity relative to the non-specific security situation.

In some implementations, security assessment device 165 may determine a quantity of attacks being encountered. For example, security assessment device 165 may determine that the quantity of attempted attacks on the web platform is less than a baseline (normal) level, approximately at the base level, exceeding the baseline level, or the like. In some implementations, security assessment device 165 may determine that the quantity of attacks satisfies a threshold quantity associated with a particular security level, and security assessment device 165 may select the threat assessment level based on the threshold quantity.

In some implementations, security assessment device 165 may determine a damage metric related to the security situation. For example, security assessment device 165 may determine a metric relating to an extent to which the web platform has been damaged in the security situation, such as an extent to which information has been exfiltrated from the web platform, an extent to which one or more webpages of the web platform have been maliciously altered, an expected cost of remediation, or the like. In this case, security assessment device 165 may determine the threat assessment level based on the metric relating to the quantity of damage.

In some implementations, security assessment device 165 may determine the threat assessment level based on multiple parameters. For example, security assessment device 165 may determine the threat assessment level based on the quantity of attacks, the specificity of the security situation, the damage metric, or the like. In some implementations, security assessment device 165 may applying a weighting to the multiple parameters. For example, security assessment may apply a first weight to the specificity of the security situation and a second weight to the damage metric when determining the threat assessment level for the security situation.

In some implementations, security assessment device 165 may determine the threat assessment level based on a threat assessment threshold. For example, a particular threat assessment level may be associated with one or more threshold criteria that, when satisfied, correspond to security assessment device 165 selecting the particular threat assessment level.

As further shown in FIG. 8, process 800 may include causing a response action, associated with the threat assessment level, to be performed (block 830). For example, security assessment device 165 may perform the response action associated with the threat assessment level. Additionally, or alternatively, security assessment device 165 may cause another device associated with the web platform to perform the response action. For example, security assessment device 165 may cause a control device of the web platform to re-configure a set of virtual networks, such as allocating a different quantity of computing resources for a particular virtual network, de-activating a particular virtual network, activating a particular virtual network, replacing a first virtual network with a second virtual network, or the like.

In some implementations, security assessment device 165 may identify the response action to be performed based on the threat assessment level when causing the response action to be performed. For example, security assessment device 165 may determine that a first threat assessment level is associated with a first set of response actions and a second threat assessment level is associated with a second set of response actions. In this case, security assessment device 165 may utilize a data structure storing information regarding response actions and threat assessment levels. Additionally, or alternatively, security assessment device 165 may select from a set of response actions. For example, security assessment device 165 may select a particular action to be performed from the multiple response actions associated with a particular threat assessment level. In some implementations, security assessment device 165 may select the response action based on the security situation. For example, security assessment device 165 may determine that a DDOS attack and a user data exfiltration attack are associated with the same threat assessment level, but may select different response actions for the DDOS attack and the user data exfiltration attack to perform remediation.

In some implementations, security assessment device 165 may provide one or more notifications based on the threat assessment level. For example, security assessment device 165 may provide an alert to a watch commander (e.g., a security user associated with managing a security situation), such as by transmitting the alert to a user device operated by the watch commander. Additionally, or alternatively, security assessment device 165 may provide information to one or more groups, such as a group of managers, a legal team, a communications team, or the like. In some implementations, security assessment device 165 may cause a group to be formed. For example, security assessment device 165 may provide information associated with the threat assessment level that triggers an incident response team (e.g., a group of users associated with managing a security situation) to be formed. In this case, security assessment device 165 may provide information associated with assigning a quantity of computing resources to the incident response team, a set of authority guidelines for the incident response team (e.g., information identifying a hierarchy of operational authority with regards to the web platform and the security situation, a level of operation authority, etc.), or the like.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
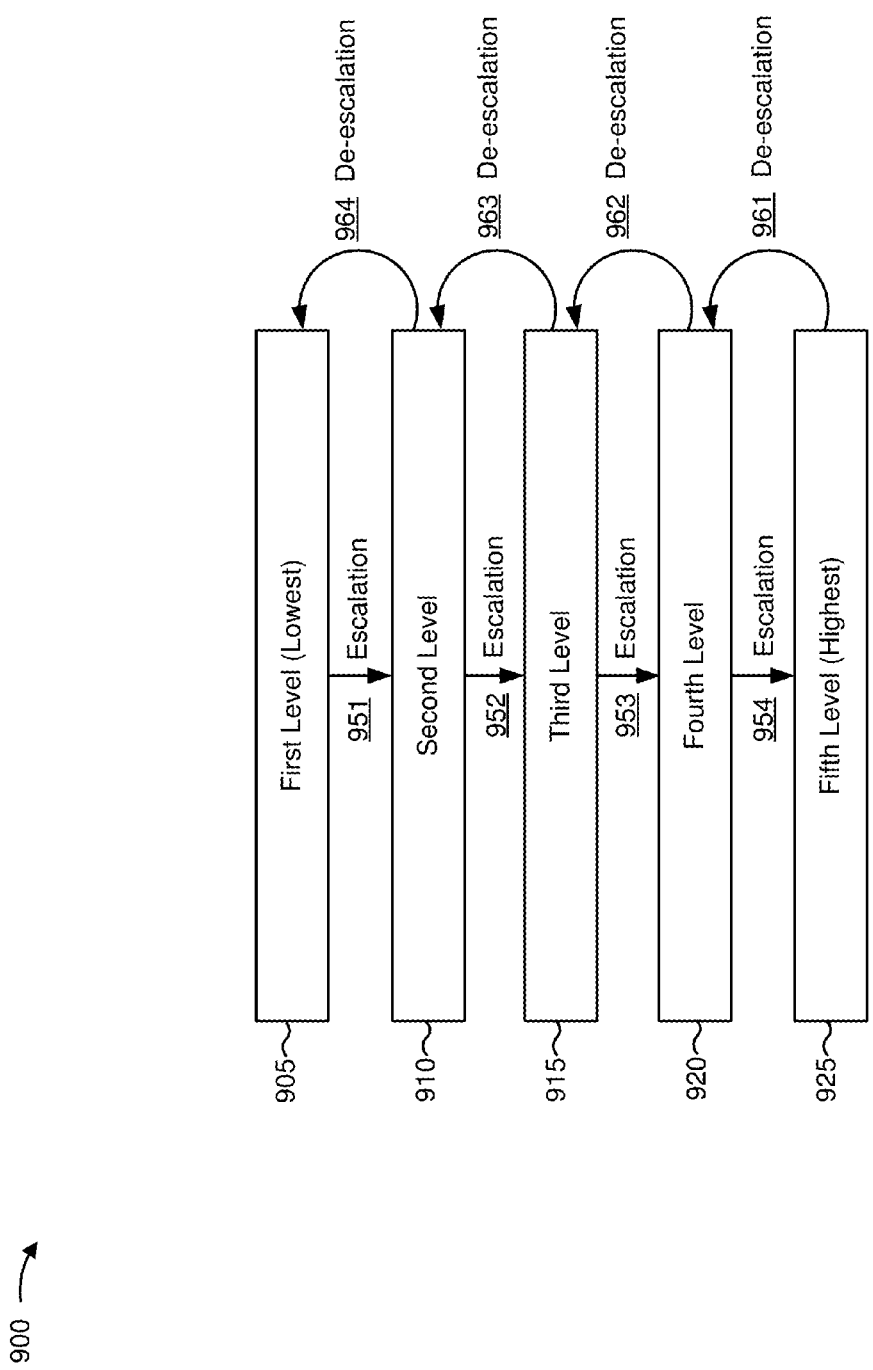
FIG. 9 is a diagram of an example of threat assessment levels relating to the example process shown in FIG. 8.

FIG. 9 is a diagram of an example implementation 900 relating to example process 800 shown in FIG. 8. FIG. 9 shows an example of threat assessment levels.

As shown in FIG. 9, security assessment device 165 may classify a security situation based on a set of classifications, such as a first level 905, a second level 910, a third level 915, a fourth level 920, and a fifth level 925. Another set of classifications including more levels, fewer levels, different levels, or the like may be used in another example.

In some implementations, each level may correspond to a set of threshold criteria. For example, a particular level may be assigned to a security situation when a threshold quantity of information is exfiltrated from a data structure. Additionally, or alternatively, a level may correspond to a group of users associated with mitigating the security situation. For example, the group of users may be pre-briefed (e.g., briefed in advance of the security situation) regarding resources allocated to the group of users, a level of authority allocated to the group of users, or the like.

First level 905 (e.g., a hierarchically lowest threat assessment level relative to other threat assessment levels of the set of classifications) may be associated with a security situation that indicates a threat failing to satisfy a significance threshold. In some implementations, first level 905 may be associated with a lack of events that expose the web platform to a threat from a known malicious attack capability. Similarly, first level 905 may be associated with a lack of detected surveillance (e.g., a lack of detection of one or more system probes, scans, or the like that may correspond to potential surveillance in advance of a malicious attack). First level 905 may be associated with a set of response actions, such as security assessment device 165 identifying mission critical information, systems, and operational importance thereof; monitoring points of access for network traffic; or the like. In some implementations, first level 905 may be associated with performing a set of baseline security practices, such as password management (e.g., causing periodic password replacement), an internal security review, an external vulnerability assessment, auditing, file backup, identifying new types of malicious files, installing patches, reporting, escalation testing (e.g., testing response actions associated with a higher threat assessment level), or the like.

Second level 910 may be associated with a security situation indicating an increased risk of attack relative to first level 905. For example, second level 910 may be associated with a general threat to the web platform (e.g., a relatively higher level of threat than the threat failing to satisfy a significance threshold). In some implementations, second level 910 may be associated with one or more events associated with an increased likelihood of an attack directed at the web platform, a threshold quantity of detected surveillance, or the like. In some implementations, second level 910 may be associated with a set of elevated security practices relative to first level 905, such as an increased level of auditing, an increased level of file backup, generation of notifications for web platform users regarding the general threat, adoption of one or more defensive tactics (e.g., enabling additional firewalls, increasing a level of firewall filtering, etc.), employment of enhanced reporting procedures, proactive threat assessment level escalation (e.g., escalating the threat assessment level to a higher threat assessment level prior to the criteria for the higher threat assessment level being satisfied), or the like.

Third level 915 may be associated with a security situation indicating a specific risk of an attack. For example, third level 915 may be associated with a determined or predicted targeting of a particular system, location, unit, or operation associated with the web platform. In some implementations, third level 915 may be associated with an occurrence of a major event associated with the web platform and corresponding to an increased likelihood of attack, a quantity of surveillance satisfying an increased threshold relative to second level 910, a detected network penetration or denial of service attack attempt (e.g., but without impact to the web platform), or the like. In some implementations, third level 915 may be associated with a set of elevated security practices relative to second level 910, such as performing a proactive defensive action, an increased level of auditing, an increased level of file backup, an internal security review of one or more critical systems of the web platform, assessment of new vulnerabilities, performing patching related to the new vulnerabilities, an increased level of reporting, or the like.

Fourth level 920 may be associated with a security situation indicating a limited attack. For example, fourth level 920 may be associated with a detected ongoing attack, a predicted imminent attack, or the like. In some implementations, fourth level 920 may be associated with an attack that causes limited interference with web platform operations, such as based on detecting a threshold attack successfulness, performing attack prevention with a threshold level of successfulness, determining that a threshold quantity of data and/or systems have been compromised, determining that the web platform satisfies an operation threshold (e.g., a threshold relating to an assessment of whether operation of the web platform is compromised by the attack), or the like. For example, fourth level 920 may be associated with an attack that is associated with a known recovery path, a suspected PCI leak, or the like. In some implementations, fourth level 920 may be associated with a set of elevated security practices relative to third level 915, such as performing one or more response actions associated with the known recovery path, increasing a level of auditing to a threshold level, increasing a level of file backup to a threshold level, reconfiguration of one or more modules of the web platform to reduce vulnerabilities, rerouting one or more system operations of the web platform to one or more unaffected systems of the web platform, executing one or more defense techniques, increasing reporting to a threshold level, proactive threat assessment level escalation, or the like.

Fifth level 925 may be associated with a security situation indicating a general attack. For example, fifth level 925 may be associated with a detected attack with a threshold impact to one or more operations relating to the web platform. In some implementations, fifth level 925 may be associated with a threshold quantity of incidents that reduce web platform functionality relative to pre-attack web platform functionality, a threshold risk to system data and/or one or more modules associated with the web platform, an attack associated with a recovery path that is not known, a confirmed PCI leak, or the like. In some implementations, fifth level 925 may be associated with a set of elevated security practices relative to fourth level 920, such as assigning alternate devices and/or computing resources for routing communication regarding security procedures, providing information associated with and/or causing deactivation of one or more portions of the web platform, providing information associated with and/or causing an isolation of one or more devices and/or computing resources of the web platform, or the like.

As shown by reference numbers 951-954 and 961-964, security assessment device 165 may cause an escalation from a relatively lower threat assessment level to a relatively higher threat assessment level (e.g., from first level 905 to second level 910) and/or a de-escalation from a relatively higher threat assessment level to a relatively lower threat assessment level (e.g., from fourth level 920 to third level 915). In some implementations, security assessment device 165 may cause an escalation of two or more levels. For example, security assessment device 165 may, when determining the threat assessment level, cause an escalation from first level 905 to fourth level 920, without causing the web platform to operate at second level 910 and/or third level 915.

As indicated above, FIG. 9 is provided merely as an example. Other examples are possible and may differ from what was described with regard to FIG. 9.

FIG. 10 is a diagram of an example implementation 1000 relating to example process 800 shown in FIG. 8. FIG. 10 shows an example of performing a security assessment.

As shown in FIG. 10, as shown by reference 1002, security assessment device 165 may begin operation, which may include monitoring for information regarding a security situation, as shown by reference number 1004. As shown by reference number 1006 based on obtaining information regarding the situation when monitoring, security assessment device 165 may determine that a security condition (e.g., a threshold associated with identifying a particular security situation) is triggered, such as detecting a threshold quantity of scans of the web platform indicating potential surveillance for an attack. As shown by reference number 1008, security assessment device 165 provides a notification to a watch commander regarding the security condition being triggered. As shown by reference number 1010, security assessment device 165 may determine whether first level 905 is met by the security condition being triggered. In some implementations, security assessment device 165 may receive information associated with assessing the security situation based on providing the notification to the watch commander. If one or more criteria associated with first level 905 are not satisfied, security assessment device 165 may continue monitoring. If the one or more criteria are satisfied, security assessment device 165 may generate a notification indicating that first level 905 is met, as shown by reference number 1012, and may cause one or more response actions to be performed.

As further shown in FIG. 10, and by reference number 1014, security assessment device 165 may determine whether one or more criteria associated with second level 910 are satisfied by the security condition being triggered. If the one or more criteria associated with second level 910 are not satisfied, security assessment device 165 may establish the threat assessment level at first level 905, and may continue monitoring. If the one or more criteria are satisfied, security assessment device 165 may escalate the threat assessment level to second level 910, may generate an alert notification, as shown by reference number 1016, and may cause one or more response actions to be implemented.

As further shown in FIG. 10, and by reference number 1018, security assessment device 165 may determine whether one or more criteria associated with third level 915 are met by the security condition being triggered. If the one or more criteria associated with third level 915 are not satisfied, security assessment device 165 may establish the threat assessment level at second level 910, and may continue monitoring. If the one or more criteria are satisfied, security assessment device 165 may escalate the threat assessment level to third level 915, may generate an alert notification, as shown by reference number 1020. As shown by reference number 1022, security assessment device 165 may engage one or more designated system administrators, and may cause one or more response actions to be implemented. The one or more designated system administrators may include a set of users that are designated a set of computing resources and a particular authority for managing the security situation, such as an authority to activate a backup system, an authority to perform one or more defensive techniques, or the like. Security assessment device 165 may provide a notification to the one or more designated system administrators, select the one or more designated system administrators from a group of designated system administrators, or the like.

As further shown in FIG. 10, and by reference number 1024, security assessment device 165 may determine whether one or more criteria associated with fourth level 920 are met by the security condition being triggered. If the one or more criteria associated with fourth level 920 are not satisfied, security assessment device 165 may establish the threat assessment level at third level 915, and may continue monitoring. If the one or more criteria are satisfied, security assessment device 165 may escalate the threat assessment level to fourth level 920, and may generate an alert notification as shown by reference number 1026. As shown by reference numbers 1028 and 1030, security assessment device 165 may form an incident response team (IRT) and/or an incident management group (IMG) based on escalating to fourth level 920. The IRT may designate an incident response recovery lead (IRRL) (e.g., a team leader), may utilize pre-designated computing resources, may exercise enhanced decision making authority relative to the one or more designated system administrators based on a decision of the IRRL, and may remain active until the security situation is resolved. The IMG may provide communications support for the IRT and may exercise enhanced decision making authority relative to the IRT.

As further shown in FIG. 10, and by reference number 1032, security assessment device 165 may determine whether one or more criteria of fifth level 925 are met by the security condition being triggered. If the one or more criteria associated with fifth level 925 are not satisfied, security assessment device 165 may establish the threat assessment level at fourth level 920, and may continue monitoring. If the one or more criteria are satisfied, security assessment device 165 may escalate the threat assessment level to fifth level 925, and may form an emergency management committee (EMC), as shown by reference number 1036. The EMC may include critical stakeholders, such as business owners of the web platform, communications representatives, legal representatives, or the like and may exercise enhanced decision making authority relative to the IMG, such as shut-down authority with regard to the web platform. As further shown by reference number 1036, the IRT, IMG, EMG, or the like may remain active until the security situation is resolved. If the security situation is not resolved, security assessment device 165 may for another group, cause additional computing resources to be provided to the group, provide an additional alert notification, or the like. When the security situation is resolved, as shown by reference numbers 1038 and 1040, security assessment device 165 may generate one or more notifications indicating that the security situation is resolved and may perform close-out activities, which may include disbanding the IRT, IMG, EMG, or the like, de-escalating to first level 905, or the like.

As indicated above, FIG. 10 is provided merely as an example. Other examples are possible and may differ from what was described with regard to FIG. 10.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    a build server to:
        receive a development update,
        authenticate the development update, and
        progress the development update through multiple stages of development,
            the multiple stages of development including:
                a first virtual network including a group of development servers for developing the development update;
                a second virtual network including a group of quality assurance and testing servers for performing quality assurance and testing on the development update after developing the development update;
                a third virtual network including a group of end-to-end testing servers for performing end-to-end testing on the development update after performing quality assurance and testing;
                a fourth virtual network including a group of staging servers for performing pre-production staging of the development update after performing end-to-end testing on the development update; and
                a fifth virtual network including a group of production servers for implementing the development update after performing pre-production staging of the development update,
                    the build server connecting to the first virtual network, the second virtual network, the third virtual network, the fourth virtual network, and the fifth virtual network in a hub-and-spoke configuration.

2. The system of claim 1, where the first virtual network, the second virtual network, and the third virtual network are not payment card industry data security standard (PCI) compliant; and
    where the fourth virtual network and the fifth virtual network are PCI compliant.

3. The system of claim 1, where the fourth virtual network is configured to resemble the fifth virtual network.

4. The system of claim 1, where the build server is configured to:
    receive, from a first stage of development, information indicating that the development update passed a set of tests associated with the first stage of development,
        the first stage of development being performed by the first virtual network; and progress the development update to a second stage of development,
        the second stage of development being performed by the second virtual network.

5. The system of claim 1, where the build server is configured to:
    receive, from a first stage of development, information indicating that the development update passed a set of tests associated with the first stage of development,
        the first stage of development being performed by the second virtual network; and progress the development update to a second stage of development,
        the second stage of development being performed by the third virtual network.

6. The system of claim 1, where the build server is configured to:
    receive, from a first stage of development, information indicating that the development update passed a set of tests associated with the first stage of development,
        the first stage of development being performed by the third virtual network; and progress the development update to a second stage of development,
        the second stage of development being performed by the fourth virtual network.

7. The system of claim 1, where the build server is configured to:
    receive, from a first stage of development, information indicating that the development update passed a set of tests associated with the first stage of development,
        the first stage of development being performed by the fourth virtual network; and progress the development update to a second stage of development,
        the second stage of development being performed by the fifth virtual network.

8. The system of claim 1, where the build server is configured to:
    receive information indicating that the development update does not satisfy one or more tests of the second virtual network, the third virtual network, or the fourth virtual network;
    receive a subsequent version of the development update; and
    provide the subsequent version of the development update to the first virtual network.

9. A method, comprising:
    receiving, by a device, a development update for testing via a plurality of virtual networks,
        the development update being associated with a web platform for product delivery;
    authenticating, by the device, the development update;
    providing, by the device, the development update to a first virtual network, of the plurality of virtual networks, to perform development testing on the development update based on authenticating the development update;
    providing, by the device, the development update to a second virtual network, of the plurality of virtual networks, to perform quality assurance and testing on the development update after receiving a result from providing the development update to the first virtual network;

providing, by the device, the development update to a third virtual network, of the plurality of virtual networks, to perform end to end testing on the development update after receiving a result from providing the development update to the second virtual network;

providing, by the device, the development update to a fourth virtual network, of the plurality of virtual networks, to perform pre-production staging of the development update after receiving a result from providing the development update to the third virtual network; and providing, by the device, the development update to a fifth virtual network, of the plurality of virtual networks, to implement the development update after receiving a result from providing the development update to the fourth virtual network, the device connecting to the first virtual network, the second virtual network, the third virtual network, the fourth virtual network, and the fifth virtual network, in a hub-and-spoke configuration.

10. The method of claim 9, further comprising:
receiving another development update for testing;
determining that the other development update does not satisfy one or more criteria for authenticating the other development update;
rejecting the other development update for testing; and
receiving the development update after rejecting the other development update for testing.

11. The method of claim 9, further comprising:
receiving another development update for testing;
providing the other development update to a particular virtual network of the plurality of virtual networks;
receiving information, from the particular virtual network, indicating that the other development update does not satisfy one or more testing criteria of the particular virtual network;
rejecting the other development update; and
receiving the development update after rejecting the other development update.

12. The method of claim 9, where the result from the first virtual network indicates:
that the development update satisfies one or more testing criteria of the first virtual network.

13. The method of claim 9, further comprising:
determining a quantity of computing resources for a particular virtual network, of the plurality of virtual networks, to perform one or more tests on the development update; and
allocating the quantity of computing resources to the particular virtual network.

14. The method of claim 13, further comprising:
determining that the particular virtual network has completed the one or more tests on the development update;
determining another quantity of computing resources for the particular virtual network after determining that the particular virtual network has completed the one or more tests on the development update; and
allocating the other quantity of computing resources to the particular virtual network,
the other quantity of computing resources being less than the quantity of computing resources.

15. A virtual network comprising:
one or more computing resources to:
receive a development update from a client device for testing via a plurality of virtual networks;
authenticate the development update;
provide the development update to a development virtual network, of the plurality of virtual networks, to perform a set of development tests;
receive information indicating that the development update satisfies the set of development tests;
provide the development update to quality assurance and testing virtual network, of the plurality of virtual networks, to perform a set of quality assurance and testing tests;
receive information indicating that the development update satisfies the set of quality assurance and testing tests;
provide the development update to an end-to-end testing virtual network, of the plurality of virtual networks, to perform a set of end-to-end tests;
receive information indicating that the development update satisfies the set of end-to-end tests;
provide the development update to a staging virtual network, of the plurality of virtual networks, to perform a set of staging tests;
receive information indicating that the development update satisfies the set of staging tests; and
provide information associated with the development update based on receiving the information indicating that the development update satisfies the set of staging tests.

16. The virtual network of claim 15, where the one or more computing resources, when providing information associated with the development update, are to:
cause the development update to be scheduled for integration into a web platform associated with the plurality of virtual networks.

17. The virtual network of claim 15, where the one or more computing resources, when providing information associated with the development update, are to:
provide the development update to a production virtual network, of the plurality of virtual networks, to integrate the development update into a web platform of the production virtual network.

18. The virtual network of claim 17, where the staging virtual network is configured to resemble the production virtual network; and
where the set of staging tests are associated with testing incorporation of the development update into the web platform of the production virtual network.

19. The virtual network of claim 17, where the virtual network is connected to the development virtual network, the quality assurance and testing virtual network, the end-to-end testing virtual network, the staging virtual network, and the production virtual network in a hub-and-spoke configuration.

20. The virtual network of claim 15, where the one or more computing resources are dynamically scaled based on a demand of the virtual network for the one or more computing resources.

* * * * *